(12) United States Patent
Van Der Mee et al.

(10) Patent No.: US 10,640,644 B2
(45) Date of Patent: May 5, 2020

(54) COPOLYCARBONATE COMPOSITIONS HAVING ENHANCED OPTICAL PROPERTIES, ARTICLES FORMED THEREFROM, AND METHODS OF MANUFACTURE

(71) Applicant: SABIC GLOBAL TECHNOLOGIES B.V., Bergen Op Zoom (NL)

(72) Inventors: Mark Adrianus Johannes Van Der Mee, Breda (NL); Nathalie Gonzalez Vidal, Bergen Op Zoom (NL); Fabrizio Micciche, Breda (NL); Roland Sebastian Assink, Middelburg (NL); Kazuhiko Mitsui, Moka (JP); Johannes De Brouwer, Oisterwuk (NL); Shahram Shafaei, Bergen Op Zoom (NL); Hendrikus Petrus Cornelis Van Heerbeek, Bergen Op Zoom (NL); Tamara Marijke Eggenhuisen, Breda (NL); Robert Dirk Van De Grampel, Tholen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/302,322

(22) PCT Filed: May 27, 2017

(86) PCT No.: PCT/IB2017/053136
§ 371 (c)(1),
(2) Date: Nov. 16, 2018

(87) PCT Pub. No.: WO2017/203493
PCT Pub. Date: Nov. 30, 2017

(65) Prior Publication Data
US 2019/0218391 A1   Jul. 18, 2019

Related U.S. Application Data

(60) Provisional application No. 62/342,414, filed on May 27, 2016.

(51) Int. Cl.
*C08L 69/00* (2006.01)
*G02B 1/04* (2006.01)
(Continued)

(52) U.S. Cl.
CPC .............. *C08L 69/00* (2013.01); *C08G 64/12* (2013.01); *C08K 5/42* (2013.01); *G02B 1/04* (2013.01);
(Continued)

(58) Field of Classification Search
CPC .............. C08L 69/00; C08L 2205/025; C08L 2205/03; C08L 2201/08; G02B 1/04; C08K 5/42; C08G 64/12
See application file for complete search history.

(56) References Cited

U.S. PATENT DOCUMENTS 5,344,910 A    9/1994  Sybert
5,475,152 A   12/1995  Kissinger et al.
(Continued)

FOREIGN PATENT DOCUMENTS

EP   0788839 B1   5/2003
EP   1808726 A1   7/2007
(Continued)

OTHER PUBLICATIONS

Anderson et al.; "Quantitative Analysis of Commercial Bisphenol A by Paper Chromatography"; Analytical Chemistry; vol. 31, No. 7; 1959; p. 1214-1217.
(Continued)

*Primary Examiner* — Robert S Jones
(74) *Attorney, Agent, or Firm* — Cantor Colburn LLP

(57) ABSTRACT

A thermoplastic composition comprises: a copolycarbonate comprising bisphenol A carbonate units and second carbonate units of the formula (I); and 2 to 40 ppm of an organosulfonic stabilizer of the formula (II); wherein the second carbonate units are present in an amount of 20 to 49 mol %, preferably 30 to 40 mol % based on the sum of the moles of the copolycarbonate and the bisphenol A homopolycarbonate, and optionally the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and the thermoplastic composition has: a Vicat B120 of 160° C. or higher measured according to ISO 306; and a yellowness index of less than 12, measured according to ASTM D1925.

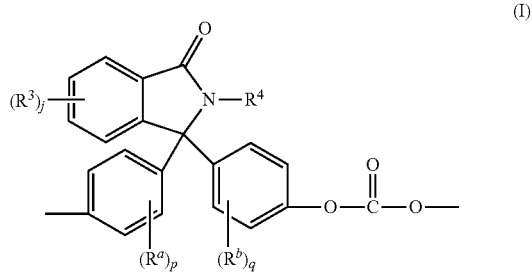

12 Claims, No Drawings

(51) Int. Cl.
*C08K 5/42* (2006.01)
*C08G 64/12* (2006.01)
*G02B 1/14* (2015.01)
*G02B 1/11* (2015.01)

(52) U.S. Cl.
CPC .............. *G02B 1/041* (2013.01); *G02B 1/11* (2013.01); *G02B 1/14* (2015.01); *C08L 2201/08* (2013.01); *C08L 2205/025* (2013.01); *C08L 2205/03* (2013.01)

(56) References Cited

U.S. PATENT DOCUMENTS

| | | | |
|---|---|---|---|
| 5,475,154 A | 12/1995 | Lundquist et al. | |
| 5,502,153 A | 3/1996 | Sakashita et al. | |
| 7,112,703 B2 | 9/2006 | Neumann et al. | |
| 7,642,315 B2* | 1/2010 | Davis .................. | C08G 64/183 264/176.1 |
| 9,062,196 B2 | 6/2015 | Chatterjee et al. | |
| 9,287,471 B2 | 3/2016 | De Brouwer et al. | |
| 9,290,618 B2 | 3/2016 | De Brouwer et al. | |
| 9,299,898 B2 | 3/2016 | De Brouwer et al. | |
| 9,546,269 B2 | 1/2017 | Vollenberg et al. | |
| 9,732,185 B2 | 8/2017 | Takimoto et al. | |
| 9,771,452 B2 | 9/2017 | De Brouwer et al. | |
| 2003/0232957 A1 | 12/2003 | Silvi et al. | |
| 2004/0077820 A1 | 4/2004 | Silva et al. | |
| 2005/0070615 A1 | 3/2005 | Terajima et al. | |
| 2005/0209434 A1 | 9/2005 | Abad et al. | |
| 2005/0288407 A1* | 12/2005 | Heuer ...................... | C08K 5/42 524/155 |
| 2006/0069292 A1 | 3/2006 | Kumar et al. | |
| 2007/0004941 A1 | 1/2007 | Blaschke et al. | |
| 2007/0010619 A1 | 1/2007 | Chatterjee et al. | |
| 2007/0100021 A1 | 5/2007 | Glasgow et al. | |
| 2007/0123686 A1 | 5/2007 | Mahood et al. | |
| 2008/0058497 A1 | 3/2008 | Ganesan et al. | |
| 2009/0088504 A1 | 4/2009 | Chatterjee et al. | |
| 2011/0071261 A1 | 3/2011 | Hoeks et al. | |
| 2011/0151262 A1 | 6/2011 | Heuer et al. | |
| 2012/0157653 A1 | 6/2012 | Konig et al. | |
| 2013/0108820 A1 | 5/2013 | Belfadhel et al. | |
| 2013/0225763 A1* | 8/2013 | Pai-Paranjape ......... | C08G 64/04 524/611 |
| 2013/0270591 A1 | 10/2013 | De Brouwer et al. | |
| 2014/0051802 A1 | 2/2014 | De Brouwer et al. | |
| 2014/0051803 A1 | 2/2014 | De Brouwer et al. | |
| 2016/0222191 A1* | 8/2016 | Sharifi .................. | C08K 5/527 |
| 2016/0237210 A1 | 8/2016 | Mahood et al. | |
| 2019/0169368 A1 | 6/2019 | Van Der Mee et al. | |
| 2019/0203043 A1 | 7/2019 | Van Der Mee et al. | |
| 2019/0276665 A1 | 9/2019 | Van Der Mee et al. | |
| 2019/0300701 A1 | 10/2019 | Van Der Mee et al. | |

FOREIGN PATENT DOCUMENTS

| | | | |
|---|---|---|---|
| GB | 1377227 A | 12/1974 | |
| JP | 09040854 A | 2/1997 | |
| JP | 2000191899 A1 | 7/2000 | |
| WO | 2007136934 A1 | 11/2007 | |
| WO | 2009045791 A1 | 4/2009 | |
| WO | 2012150559 A1 | 11/2012 | |
| WO | 2012150560 A1 | 11/2012 | |
| WO | 2013061274 A1 | 5/2013 | |
| WO | 2013175448 A1 | 11/2013 | |
| WO | 2014031730 A1 | 2/2014 | |
| WO | 2014072923 A1 | 5/2014 | |
| WO | WO-2015044912 A1 * | 4/2015 | ............ C08K 5/527 |

OTHER PUBLICATIONS

Anonymous, "Polycarbonate preparation with a low yellowness index," Research Disclosure, Mason Publications, Hampshire GB vol. 449, No. 49 (Sep. 1, 2001) ISSN: 0374-4353 pp. 1-3.
Brunelle, D.J.: "Polycarbonates", Encyclopedia of Polymer Science and Technology, Jan. 1, 2006, pp. I.1-33, XP002525090, DOI: 10.1002/0471440264PST255.PUB2, Retrieved from the Internet: URL: http://mrw.interscience.wiley.com/emrw/9780471440260/epst/article/p.
Brydia; "Determination of Bisphenol A and Impurities by Gas Chromatography of Their Trimethylsilyl Ether Derivatives" Analytical Chemistry; vol. 40, No. 14; 1968; pp. 2212-2215.
De Brouwer et al.; "Lexan* Polycarbonate for Optical Applications"; Sabic Innovative Plastics; Received Aug. 2, 2011; 5 Pages.
Factor; "Search for the Sources of Color in Thermally Aged, Weathered and y-Ray Irradiated Bisphenol A Polycarbonate"; Die Angewandte Makromolekulare Chemie; vol. 232; 1995; pp. 27-43.
Godinez et al.; "Experimental Study of the Influence of Raw Material Impurities on Yellowness Index of Transesterification Polycarbonate"; Journal of Applied Polymer Science; vol. 119; 2011; pp. 1348-1356.
International Preliminary Report on Patentability; International Application no. PCT/IB2017/053136; International Filing Date May 27, 2017; dated Apr. 24, 2018, 17 Pages.
International Search Report for International Application No. PCT/IB2017/053136, International Filing Date May 27, 2017, dated Sep. 7, 2017, 5 pages.
Nowakowska et al.; "Studies of Some Impurities in Commercial Bisphenol-A"; Polish Journal of Applied Chemistry; vol. XL, No. 3; 1996; pp. 247-254.
Poskrobko et al.; "High-Performance Liquid Chromatography with Multi-Wavelength Detection of the Bisphenol A Impurities"; Journal of Chromatography A; vol. 883; 2000; pp. 291-297.
Sullivan et al.; "The Effects of Inorganic Solid Particles on Water and Crude Oil Emulsion Stability"; Ind. Eng. Chem. Res.; 2002; vol. 41; pp. 3389-3404.
Tadros; "Emulsion Formation, Stability, and Rheology"; first edition; 2013; 76 pages.
Underwriter's Laboratory Bulletin 94, "Tests for Flammability of Plastic Materials for Parts in Devices and Appliances" (ISBN 0-7629-0082-2), Fifth Edition, Dated Oct. 29, 1996, incorporating revisions through and including Dec. 12, 2003; 52 pages.
Written Opinion for International Application No. PCT/IB2017/053136, International Filing Date May 27, 2017, dated Sep. 7, 2017, 6 pages.
Machine Translation of Japanese Office Action dated Jul. 5, 2019 for JP 2018-561968, 5 pages.

* cited by examiner

COPOLYCARBONATE COMPOSITIONS HAVING ENHANCED OPTICAL PROPERTIES, ARTICLES FORMED THEREFROM, AND METHODS OF MANUFACTURE

CROSS REFERENCE TO RELATED APPLICATIONS

This application is a National Stage application of PCT/IB2017/053136, filed May 27, 2017, which claims the benefit of U.S. Provisional Application No. 62/342,414, filed May 27, 2016, both of which are incorporated by reference in their entirety herein.

BACKGROUND

This disclosure generally relates to polycarbonate compositions, and more particularly, to high heat copolycarbonate compositions having enhanced optical properties, methods of manufacture, and uses thereof.

Polycarbonates are useful in the manufacture of articles and components for a wide range of applications, from automotive parts to electronic devices. Because of their broad use, particularly in lenses, optical films, and healthcare products requiring high heat sterilization, it is desirable to provide polycarbonates with high heat performance combined with good optical properties, particularly after processing and after exposure to real life conditions such as prolonged exposure to high temperatures.

Some known "high heat" copolycarbonates can have high glass transition temperatures of 150° C. or higher. But such polycarbonates are typically more yellow after processing and have lower transmission values. There accordingly remains a need for polycarbonate compositions having improved balance of high heat performance and optical properties.

SUMMARY

A thermoplastic composition comprises: a copolycarbonate comprising bisphenol A carbonate units and second carbonate units of the formula

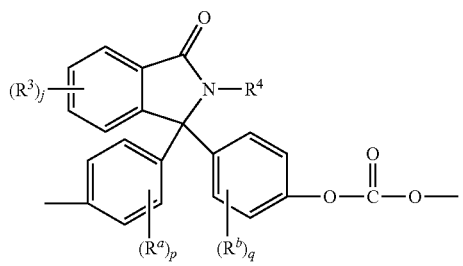

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4, optionally a bisphenol A homopolycarbonate; and 2 to 40 ppm of an organosulfonic stabilizer of the formula

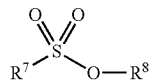

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is $C_{1-30}$ alkyl; or $R^8$ is a group of the formula —S($=$O)$_2$—R$^7$; wherein the second carbonate units are present in an amount of 20 to 49 mol %, preferably 30 to 40 mol % based on the sum of the moles of the copolycarbonate and the bisphenol A; and wherein the thermoplastic composition has: a Vicat B120 of 160° C. or higher measured according to ISO 306; and a yellowness index of less than 12, preferably less than 8, more preferably less than 6 measured according to ASTM D1925 on a plaque of 2.5 mm thickness molded at a temperature of 355° C. for a residence time of 10 minutes.

In another embodiment, an article comprises the above-described thermoplastic composition. The article can be a molded article, a thermoformed article, an extruded layer, a layer of a multi-layer article, a substrate for a coated article, or a substrate for a metallized article.

In still another embodiment, a method of manufacture of an article comprises injection molding, injection-compression molding, heat-cool molding, extrusion, rotational molding, blow molding, or thermoforming the above-described thermoplastic composition into an article.

The above described and other features are exemplified by the following drawings, detailed description, examples, and claims.

DETAILED DESCRIPTION

Surprisingly, it has now been found that a thermoplastic composition comprising phthalimidine copolycarbonates such as N-phenylphenolphthaleinyl bisphenol, 2,2-bis(4-hydro)-bisphenol A copolycarbonate ("PPPBP-BPA"), optionally a bisphenol A homopolymer, and an organosulfonic acid, acid ester, or acid anhydride stabilizer has desirable high glass transition temperature and enhanced optical properties. In particular, the thermoplastic composition may not only have good initial color and transmission after molding under standard conditions, but also lower color change after molding at aggressive conditions. This would allow using these compositions in more demanding applications, for example tool designs requiring high melt temperatures to completely fill the tool or articles that have demanding requirements on color stability during part lifetime under one or more of high heat, hydro (high moisture), and high ultraviolet (UV) conditions.

As used herein, phthalimidine copolycarbonates are high heat copolycarbonates having a glass transition temperature of 155° C. or higher, and comprising bisphenol A carbonate units and second carbonate units of formula (1)

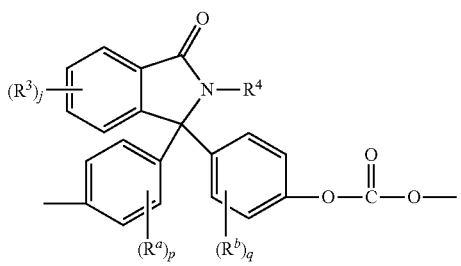

(1)

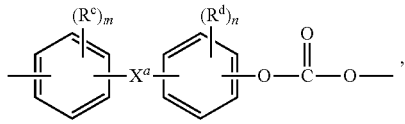

(3)

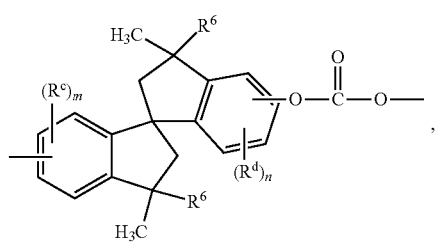

(4)

wherein $R^a$ and $R^b$ are each independently a $C_{1-12}$ alkyl, $C_{1-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1 to 5 $C_{1-6}$ alkyl groups, and p and q are each independently 0 to 4, preferably 0 to 1. For example, second carbonate units can be of formula (1a)

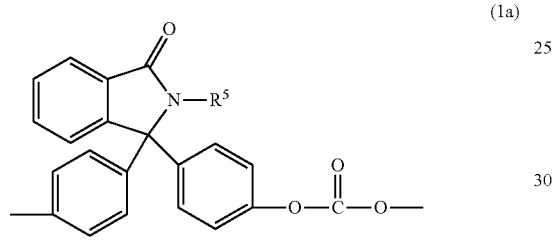

(1a)

(5)

wherein $R^5$ is hydrogen, phenyl optionally substituted with up to five $C_{1-6}$ alkyl groups, or $C_{1-4}$ alkyl, such as methyl or $C_{2-4}$ alkyl. In an embodiment, $R^5$ is hydrogen or phenyl, preferably phenyl. Carbonate units (1a) wherein $R^5$ is phenyl can be derived from 2-phenyl-3,3'-bis(4-hydroxy phenyl) phthalimidine (also known as 3,3-bis(4-hydroxyphenyl)-2-phenylisoindolin-1-one or N-phenyl phenolphthalein or "PPPBP"). Bisphenol A carbonate units have formula (2).

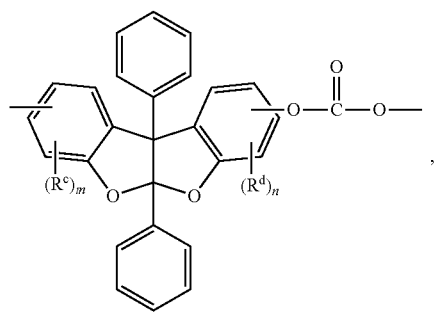

(6)

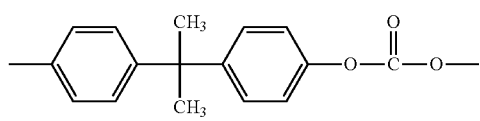

(2)

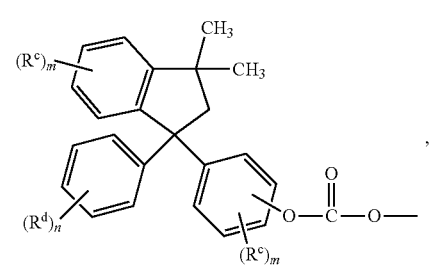

The copolycarbonate comprises 15 to 90 mole percent (mol %) of the bisphenol A carbonate units and 10 mol % to 85 mol % of the second carbonate units, preferably the copolycarbonate comprises from 50 to 90 mol % of the bisphenol A carbonate units and 10 to 50 mol % of the second carbonate units, and more preferably the copolycarbonate comprises from 50 to 70 mol % of the bisphenol A carbonate units and 30 to 50 mol %, or 60 to 70 mol % of the bisphenol A carbonate units and 30 to 40 mol % of the second carbonate units, each based on the total number of carbonate units in the copolycarbonate.

In some embodiments, the high heat copolycarbonates further include third carbonate units different from bisphenol A carbonate units and second carbonate units. The third carbonate units can have the formula

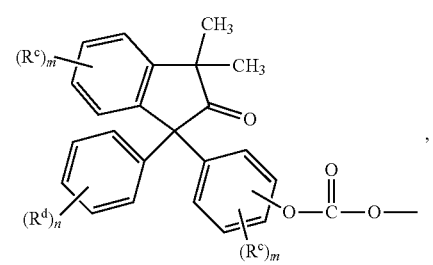

(7)

or a combination thereof, wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, -$(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, or —C($P^1$)($P^2$) wherein $P^1$ is $C_{1-12}$ alkyl and $P^2$ is $C_{6-12}$ aryl; and m and n are each independently 0 to 4.

Exemplary third carbonate units include the following

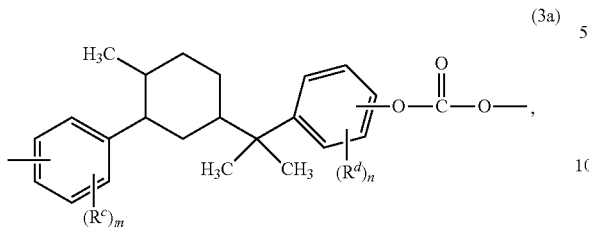
(3a)

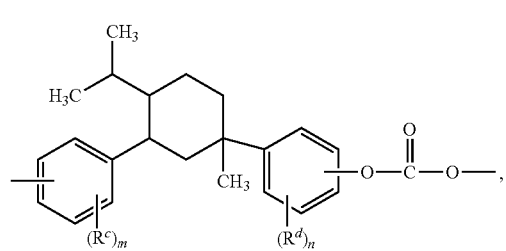
(3b)

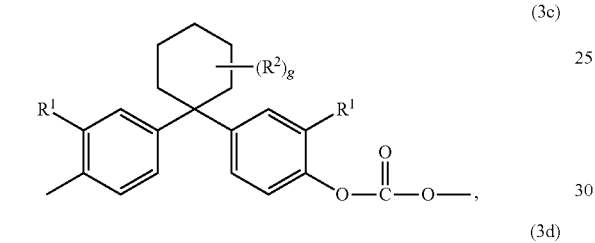
(3c)

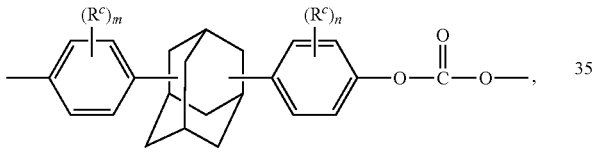
(3d)

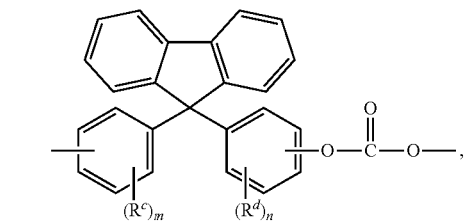
(3e)

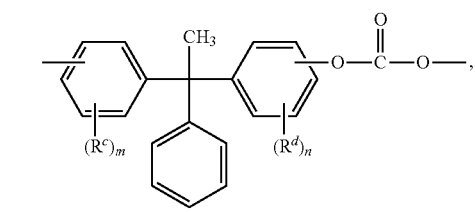
(3f)

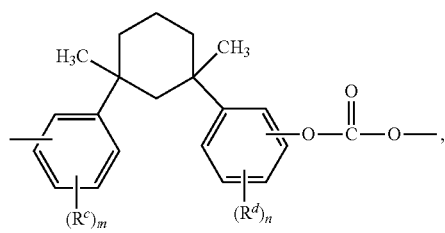
(3g)

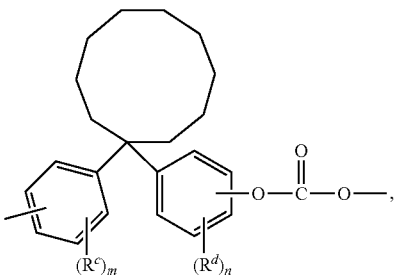
(3g)

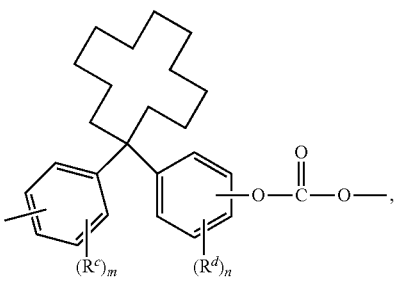
(3h)

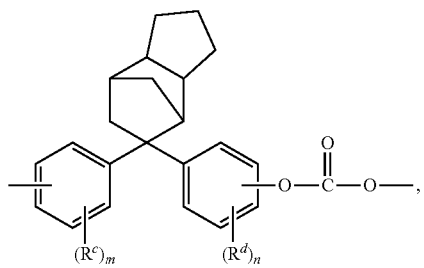
(3i)

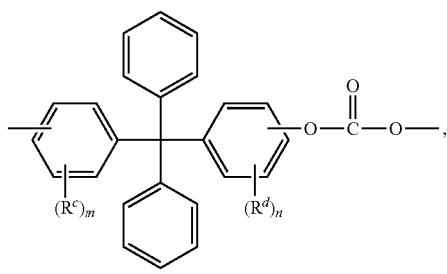
(3j)

or a combination thereof, wherein $R^c$ and $R^d$ are the same as defined herein for formulas (3) to (5), each $R^1$ is independently hydrogen or $C_{1-4}$ alkyl, each $R^2$ is independently $C_{1-4}$ alkyl, and g is 0 to 10. Preferably, each $R^1$ is independently hydrogen or methyl, each $R^2$ is independently methyl or hydrogen, g is 0 to 2, and m and n are 0. In a specific embodiment the third carbonate units are 1,1-bis(4-hydroxyphenyl)-3,3,5-trimethyl-cyclohexane carbonate units, 1,1-bis(4-hydroxy-3-methylphenyl)cyclohexane, or a combination thereof. Preferably, the third carbonate units are 1,1-bis(4-hydroxyphenyl)-3,3,5-trimethyl-cyclohexane (BPA TMC) carbonate units.

When the third carbonate units are present, the copolycarbonates can comprise 10 to 70 mol % of the bisphenol A carbonate units, 5 to 50 mol % of the second carbonate units, and 5 to 50 mol % of the third carbonate units, each based on the sum of moles of the bisphenol A carbonate units, second carbonate units, and third carbonate units. Preferably, the copolycarbonates comprise 30 to 60 mol % of the bisphenol A carbonate units, 5 to 35 mol % of the second carbonate units, 5 to 35 mol % of the third carbonate units, each based on the sum of the moles of the bisphenol A carbonate units, second carbonate units, and third carbonate units.

In an embodiment, the copolycarbonates are highly random copolymers, which have less than 15 mol % or less than 10 mol % of the second carbonate units directly coupled to another second carbonate unit based on the total number of carbonate units in the copolycarbonates. The molar percent can be determined by nuclear magnetic resonance spectroscopy (NMR). Without wishing to be bound by theory, it is believed that by keeping the randomness of the high heat polymer, the properties of the high heat polymer remains consistent from batch to batch.

To further enhance the optical properties of the thermoplastic compositions, the high heat copolycarbonates are essentially free of certain metal ions, and preferably, low molecular weight molecules (those having a molecular weight of less than 150 Dalton) arising from the starting materials or process to manufacture of the copolymers. In an embodiment, the copolycarbonates comprise less than 2 ppm of each of triethyl amine, calcium ions, magnesium ions, potassium ions, iron ions, and chloride ions. In another embodiment, the high heat copolycarbonates comprise less than 2 ppm of each chloride, sodium, calcium, iron, nickel, copper, and zinc ions as residual impurities.

In another embodiment, which is preferred, the copolycarbonates have a very low residual impurity content, in particular less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. It is to be understood that the foregoing residual impurities can exist in the copolycarbonate compositions in un-ionized form (for example as triethylamine or formic acid), but are determined based on their ionized form.

The residual impurity content can be determined by methods known in the art, for example those described in US 2016/0237210 and U.S. Pat. No. 9,287,471 via ion chromatography. For example, determination can be accomplished via ion exchange, of a sample obtained by dissolving 2.4 gram of copolycarbonate in 20 mL of dichloromethane and extracting with 10 mL of distilled, deionized water for 1 hour. The water layer is analyzed by ion chromatography with respect to the desired anions, cations, and amines, in particular fluoride, acetate, formate, chloride, nitrite, bromide, nitrate, phosphite, sulphate, oxalate, phosphate, citrate, lithium, sodium, potassium, ammonium, magnesium, calcium, and diethylamine, and triethylamine. In another embodiment of quantitative analysis of ions, the sample can be submerged in de-ionized water kept at 55° C. for 24 hours, the anions released into the water then analyzed via ion chromatography, e.g., with a Dionex DX500 Ion Chromatograph. Alternatively, quantitative analysis of metals and other compounds can be carried out by conventional inductively coupled plasma emission spectroscopy (ICP) methods to determine the presence of each constituent to the parts per billion (ppb) level.

The high heat copolycarbonates have a weight average molecular weight (Mw) of 10,000 to 50,000 Daltons (Da), preferably 16,000 to 30,000 Da, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

The high heat copolycarbonates have a high glass transition temperature (Tg). The Tg of the high heat copolycarbonates is 155 to 280° C., more preferably 165 to 260° C., even more preferably 185 to 230° C., determined by differential scanning calorimetry (DSC) as per ASTM D3418 with a 20° C./min heating rate.

The high heat copolycarbonates can have high heat resistance. The heat deflection temperature (HDT) of the high heat copolycarbonates is 145 to 270° C., more preferably 155 to 260° C., even more preferably 175 to 220° C., measured flat on a 80×10×4 mm bar with a 64 mm span at 0.45 MPa according to ISO 75/Bf.

The high heat copolycarbonates can have high Vicat softening temperature. In an embodiment, the high heat copolycarbonates have a Vicat B120 of 150 to 275° C., preferably 160 to 255° C., even more preferably 180 to 225° C., measured according to ISO 306.

The high heat copolycarbonates can be present in an amount of 10 to 99 wt %, 90 to 99.8 wt %, 20 to 80 wt %, 40 to 70 wt %, or 50 to 70 wt % based on the total weight of the thermoplastic compositions. Preferably the second carbonate units of the high heat copolycarbonates are present in the composition in an amount of 20 to 49 mol %, preferably 30 to 40 mol % based on the sum of the moles of the copolycarbonate and the bisphenol A homopolycarbonate.

The high heat copolycarbonates can be produced using a BPA monomer having both a high level of organic purity (e.g., measured by high pressure liquid chromatography (HPLC) of greater than or equal to 99.7 wt %) and a sulfur level of less than or equal to 2 parts per million (ppm) as measured by a commercially available Total Sulfur Analysis based on combustion and coulometric detection. The organic purity can be defined as 100 wt % minus the sum of known and unknown impurities detected using ultraviolet (UV) (see HPLC method in Nowakowska et al., Polish J. Appl. Chem., XI(3), 247-254 (1996)). In addition, an end-capping agent is present during manufacture of the high heat copolycarbonate such that high heat copolycarbonate comprises a free hydroxyl level less than or equal to 250 ppm, preferably less than or equal to 200 ppm, more preferably less than or equal to 150 ppm.

Optionally, the thermoplastic compositions include a bisphenol A homopolycarbonate. The bisphenol A homopolymer carbonate can be derived from a bisphenol A monomer having a purity less than 99.7% determined by HPLC. Alternatively, the bisphenol A homopolycarbonate can be derived from a high purity bisphenol A monomer having a purity equal to or greater than 99.7% determined by HPLC.

It has been found by the inventors hereof that the optical properties of the thermoplastic composition can be further improved using bisphenol A homopolycarbonates having specific additional properties. In an embodiment, the bisphenol A homopolycarbonate is manufactured via an interfacial process using a BPA monomer having both a high level of organic purity (e.g., measured by HPLC of greater than or equal to 99.7 wt %) and a sulfur level of less than or equal to 2 parts per million (ppm) as measured by a commercially available Total Sulfur Analysis based on combustion and coulometric detection. The organic purity can be defined as 100 wt % minus the sum of known and unknown impurities detected using ultraviolet (UV) (see HPLC method in Nowakowska et al., Polish J. Appl. Chem., XI(3), 247-254 (1996)). In addition, an end-capping agent is present during manufacture of the bisphenol A homopolycarbonate such that bisphenol A homopolycarbonate comprises a free hydroxyl level less than or equal to 150 ppm.

Bisphenol A homopolycarbonates of high purity, suitable for use in the present compositions, can also be manufactured via the melt process.

These bisphenol A homopolycarbonates are characterized by specific properties. In particular, the preferred bisphenol A homopolycarbonates have a low yellowness index and are heat stable. For example, a molded sample comprising the bisphenol A homopolycarbonate has a yellowness index (YI) of 2.5 or less, 2.0 or less, 1.5 or less, 1.2 or less, or 1.1 or less as measured by ASTM D1925 on a plaque with 2.5 mm thickness. The bisphenol A homopolycarbonates can further be characterized by a molded sample thereof with a thickness of 2.5 mm having an increase in YI ($\Delta$YI) of less than 12, less than 12, or less than 10 after 5,000 hours of heat aging at 130° C. as measured by ASTM D1925. Alternatively, or in addition, the bisphenol A homopolycarbonates can have an increase in YI ($\Delta$YI) of less than 3, less than 2.5, or less than 2 after 2,000 hours of heat aging at 130° C.

The preferred bisphenol A homopolycarbonates are also transparent in the absence of any light diffusers or other fillers. For example, a molded article of the bisphenol A homopolycarbonate has transmission level greater than or equal to 90.0% at 2.5 millimeter (mm) thickness as measured by ASTM D1003-00, Procedure A, measured, e.g., using a HAZE-GUARD DUAL from BYK-Gardner, using and integrating sphere (0°/diffuse geometry), wherein the spectral sensitivity conforms to the International Commission on Illumination (CIE) standard spectral value under standard lamp D65.

In an embodiment, the bisphenol A polycarbonate homopolymer is a linear bisphenol A polycarbonate homopolymer having an Mw of 10,000 to 100,000 Da, specifically 15,000 to 50,000 Da, more specifically 17,000 to 35,000 Da, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

More than one bisphenol A polycarbonate homopolymer can be present. For example, the polycarbonate compositions can comprise a first bisphenol A polycarbonate homopolymer having an Mw of 20,000 Da to 25,000 Da and a second bisphenol A polycarbonate homopolymer having an Mw of 28,000 to 32,000 Daltons, or a second bisphenol A polycarbonate homopolymer having an Mw of 16,000 Daltons to 20,000 Daltons, each measured by GPC using bisphenol A homopolycarbonate standards. The weight ratio of the first bisphenol A polycarbonate homopolymer relative to the second bisphenol A polycarbonate homopolymer is 10:1 to 1:10, specifically 5:1 to 1:5, more specifically 3:1 to 1:3 or 2:1 to 1:2.

The polycarbonate homopolymer can be present in an amount of 10 to 90 wt %, preferably 10 to 80 wt %, 10 to 60 wt %, 15 to 50 wt %, or 20 to 45 wt %, based on the total weight of the thermoplastic composition.

In an embodiment, the bisphenol A (BPA) purity of the thermoplastic composition is equal to or greater than 99.6% or equal or greater than 99.7% measured using HPLC. As used herein, the bisphenol A purity of the thermoplastic composition refers to the overall purity of the bisphenol A monomer used to prepare the high heat copolycarbonate and the bisphenol A homopolymer, if present. The bisphenol A purity of a thermoplastic composition can be determined by a mild depolymerization followed by a HPLC analysis. For example, about 200 milligrams (mg) of the thermoplastic composition is dissolved in 5 ml of tetrahydrofuran (THF) and 2 ml of a 10% solution of potassium hydroxide diluted in methanol. The depolymerization of polycarbonate is carried out with the use of these solvents. The solution is shaken for 2 hours. Then, 2 milliliters (ml) of acetic acid are added to protonate the BPA carbonate salts and decrease the pH. The solution is shaken again for half an hour for homogenization and dissolution of all precipitates. The sample is analyzed by HPLC. The wt % of BPA impurities in the thermoplastic composition can be calculated by:

$$\text{wt \% of impurities in } BPA = \frac{\text{wt \% of impurities} * 254}{228}. \quad \text{(equation 1)}$$

In equation 1, wt % of impurities refers to the impurities measured by HPLC after depolymerization. Because the BPA molar mass is different from the carbonated BPA, the wt % of impurities is multiplied by 254 grams per mole (g/mol) and divided by 228 g/mol. An amount of 254 g/mol and 228 g/mol correspond to the BPA carbonate the BPA molar mass, respectively.

In some embodiments, it can be advantageous to use copolycarbonates and bisphenol A homopolycarbonates with very low residual contents of volatile impurities. For example, the polymer components can have a content of chlorobenzene and other aromatic chlorine compounds of less than 10 ppm, preferably less than 5 ppm and more preferably less than 2 ppm, dichloromethane of less than 1 ppm, preferably less than 0.5 ppm, monohydric phenols such as phenol, tert-butylphenol and cumylphenol of less than 15 ppm, preferably less than 5 ppm and more preferably less than 2 ppm, and alkanes of less than 10 ppm, preferably less than 5 ppm. In other embodiments, the polymers can preferably have residual contents of: carbon tetrachloride of less than 0.01 ppm, diaryl carbonates, in particular diphenyl carbonate and di-tert-butyl phenolcarbonate, of less than 5 ppm, preferably less than 2 ppm, bisphenol A and other bisphenols of less than 5 ppm, preferably less than 2 ppm and more preferably less than 0.5 ppm, sodium and other alkali metals and alkaline earth metals of less than 0.05 ppm, cresols of less than 1 ppm, preferably less than 0.2 ppm, phenolic OH groups of less than 300 ppm, preferably less than 200 ppm, more preferably less than 100 ppm, alkaline earth metals of less than 0.1 ppm, more preferably less than 0.05 ppm, pyridine of less than 1 ppm, preferably less than 0.1 ppm, nonhalogenated aromatic compounds such as xylene and toluene of less than 10 ppm, preferably less than 5 ppm. Methods for obtaining and measuring these amount are described, for example, in US2012/0157653.

The polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

It has been found that without any organosulfonic stabilizers, a thermoplastic composition containing the high heat polymer and the optional bisphenol A homopolycarbonate can have less than desirable color stability when the thermoplastic composition is molded under aggressive conditions for example at temperatures equal to or greater than 340° C., or equal to or greater than 350° C., or greater than 360° C., especially when the residence time in the molding is equal to or greater than 5 min, or equal to or greater than 10 min. Typical upper limits include 450° C. and 20 minutes.

Surprisingly it has been found that including an organosulfonic stabilizer as described herein in a thermoplastic composition containing the high heat copolycarbonate and the optional bisphenol A homopolycarbonate improves the color stability of the composition after the composition is molded under aggressive conditions, typically at high melt temperatures, such as 350° C. or higher, or prolonged residence times during molding, such as times exceeding 7.5 or 10 minutes, or both. In some embodiments it is possible to simultaneously improve the initial color of the thermoplastic composition and the color stability of the composition after the composition is molded under aggressive conditions, typically at high melt temperatures, such as 350° C. or higher, or prolonged residence times during molding, such as times exceeding 7.5 or 10 minutes, or both.

For example, a molded part of the composition with a thickness of 2.5 mm has a YI determined according to ASTM D1925 at least 30% lower, or at least 50% lower, or at least 60% lower, as compared to a reference sample of an otherwise identical composition except for not containing the organosulfonic stabilizer, when both the sample and the reference sample are molded at a temperature of equal to or greater than 340° C. In another embodiment, a molded article of the composition, when tested at thickness of 2.5 mm determined according to ASTM D1925, has a change in YI of less than 20, preferably less than 10, more preferably less than 5, following molding under aggressive conditions as compared to a reference article of an identical composition molded under standard process conditions. As used herein, aggressive molding conditions include a molding temperature of equal to or greater than 330° C., and standard molding conditions include a molding temperature equal to or of less than 330° C.

The molded article can further have high heat copolycarbonates can have high Vicat softening temperature. In an embodiment, the thermoplastic composition can have a Vicat B120 of 160° C. or higher, preferably 160 to 275° C., preferably 160 to 255° C., even more preferably 180 to 225° C., each measured according to ISO 306.

Moreover, the improvement on the color and color stability provided by the inclusion of the organosulfonic stabilizer is more significant than the improvement provided by other acid stabilizers such as $H_3PO_3$.

The organosulfonic stabilizer can be an aryl or aliphatic sulfonic acid, including a polymer thereof, an aryl or an aliphatic sulfonic acid anhydride, or an aryl or aliphatic ester of an aryl or aliphatic sulfonic acid, or a polymer thereof. In particular, the organosulfonic stabilizer is a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; an anhydride of a $C_{1-30}$ alkyl sulfonic acid, a $C_{6-30}$ aryl sulfonic acid, a $C_{7-30}$ alkylarylene sulfonic acid, or a $C_{7-30}$ arylalkylene sulfonic acid; or a $C_{6-30}$ aryl ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; or a $C_{1-30}$ aliphatic ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer. A combination of one or more of the foregoing can be used.

In preferred embodiments, the organosulfonic stabilizers are represented by formula (8)

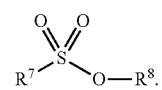

(8)

In formula (8), $R^7$ is each independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its corresponding $C_{1-32}$ alkyl ester. The $C_{2-32}$ ethylenically unsaturated aromatic sulfonic acid can be of the formula

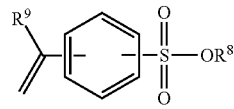

wherein $R^9$ is hydrogen or methyl, and $R^8$ is as defined in formula (8). Preferably the ethylenically unsaturated group and the sulfonic acid or ester group are located para on the phenyl ring.

Further in formula (8), $R^8$ is hydrogen; or $R^8$ is $C_{1-30}$ alkyl; or $R^8$ is a group of the formula —S(=O)$_2$—$R^7$. When $R^8$ is a group of the formula —S(=O)$_2$—$R^7$, each $R^7$ in the compound of formula (8) can be the same or different, but preferably each $R^7$ is the same.

In an embodiment in formula (8), $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula —S(=O)$_2$—$R^7$ wherein $R^7$ is a $C_{6-12}$ aryl or $C_{7-24}$ alkylarylene.

In a preferred embodiment, $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula —S(=O)$_2$—$R^7$ wherein $R^7$ is a $C_{7-10}$ alkylarylene. In a specific embodiment, $R^7$ is a $C_{7-10}$ alkylarylene and $R^8$ is a hydrogen or $C_{1-6}$ alkyl. In still another embodiment, $R^7$ is a $C_{7-10}$ alkylarylene and $R^8$ is a hydrogen or $C_{12-25}$ alkyl, or $R^8$ is a $C_{14-20}$ alkyl.

In specific embodiment, $R^7$ is a polymer unit derived from a $C_{2-14}$ ethylenically unsaturated aromatic sulfonic acid, preferably p-styrene sulfonic acid or para-methyl styrene sulfonic acid, such that in formula (8) $R^8$ is hydrogen.

In an embodiment, the organosulfonic stabilizer is a $C_{1-10}$ alkyl ester of a $C_{7-12}$ alkylarylene sulfonic acid, preferably of p-toluene sulfonic acid. More preferably the stabilizer is a $C_{1-6}$ alkyl ester of p-toluene sulfonic acid, and even more preferably is butyl tosylate.

In another embodiment, the organosulfonic stabilizer is an anhydride of a $C_{7-12}$ alkylarylene sulfonic acid, preferably para-toluene sulfonic anhydride as shown in Table 13.

In still another embodiment, $R^7$ is a $C_{11-24}$ alkylarylene sulfonic acid, and $R^8$ is hydrogen. Alternatively, $R^7$ is a $C_{16-22}$ alkylarylene sulfonic acid, and $R^8$ is hydrogen.

The organosulfonic stabilizer can be used in an amount of 2 to 40 ppm, more preferably 2 to 20 ppm, still more preferably 4 to 15 ppm, or 4 to 10 ppm, or 4 to 8 ppm by weight based on the total weight of the organic components of the thermoplastic composition.

The thermoplastic composition can also contain an epoxy additive. The inclusion of an epoxy compound can be used as a chain extender to improve molecular weight stability of the thermoplastic composition after hydroaging (for instance at 85° C. and 85% relative humidity) or autoclaving at temperatures of 121° C., 134° C., 155° C., or other temperatures above 100° C. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy modified acrylates such as JONCRYL ADR-4300 and JONCRYL ADR-4368, available from BASF. Epoxy additives are typically used in amounts of up to 1 wt %, specifically 0.001 to 1 wt %, more specifically 0.001 to 0.5 wt %, based on the total weight of the thermoplastic composition. In an embodiment, the epoxy additive can be included in an amount of 0.001 to 0.3 wt %, specifically 0.01 to 0.3 wt %, and more specifically 0.1 to 0.3 wt %, based on the total weight of the thermoplastic composition. Use of greater amounts of epoxy compound may cause more splay, i.e., mold lines which fan outward from the point of injection into the mold, and observable to the unaided eye in molded articles comprising the thermoplastic composition.

The thermoplastic compositions can include various additives ordinarily incorporated into polymer compositions of this type, with the proviso that the additive(s) are selected so as to not significantly adversely affect the desired properties of the thermoplastic composition, in particular melt flow, thermal, transparency, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, anti-drip agents, and impact modifiers. In an embodiment, the thermoplastic composition further comprises a processing aid, a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0 to 5 wt % or 0.01 to 5 wt %, based on the total weight of the thermoplastic composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or combinations comprising at least one of the foregoing light stabilizers. UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene)bis(4H-3,1-benzoxazin-4-one) (CYASORB* UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, 2-(2H-benzotriazol-2-yl)-4,6-bis(1-methyl-1-phenylethyl)-(TINUVIN* 234); BCAP bismalonate from Clariant; nano-size inorganic materials such as titanium oxide, cerium oxide, and zinc oxide, all with particle size less than or equal to 100 nanometers, or combinations comprising at least one of the foregoing UV absorbers. Light stabilizers are used in amounts of 0.01 to 5 parts by weight, based on 100 parts by weight of the thermoplastic composition, excluding any filler.

Flame retardants can also be used. Flame retardants include flame retardant salts such as alkali metal salts of perfluorinated $C_{1-16}$ alkyl sulfonates such as potassium perfluorobutane sulfonate (Rimar salt), potassium perfluorooctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. Flame retardant salts are typically used in amounts of 0.01 to 1.0 parts by weight, based on 100 parts by weight of the thermoplastic composition.

Organophosphorus flame retardants can be used. Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination thereof.

The phosphorus-containing group can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below

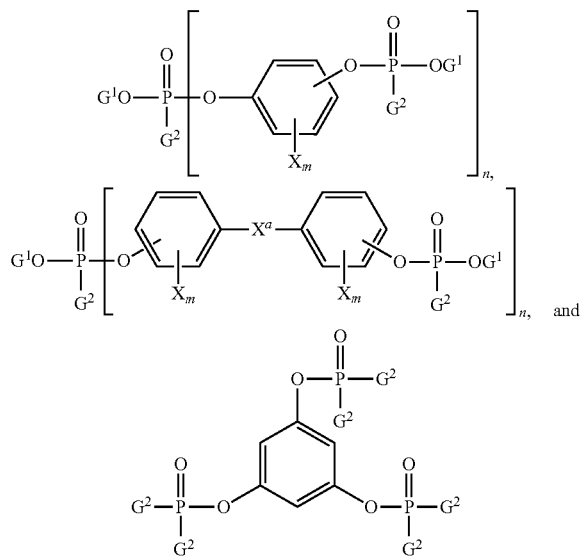

wherein each $G^1$ is independently a $C_{1-30}$ hydrocarbyl; each $G^2$ is independently a $C_{1-30}$ hydrocarbyl or hydrocarbyloxy; each X is independently a bromine or chlorine; m is 0 to 4, and n is 1 to 30. Di- or polyfunctional aromatic phosphorus-containing compounds of this type include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Specific aromatic organophosphorus compounds have two or more phosphorus-containing groups, and are inclusive of acid esters of the formula (9)

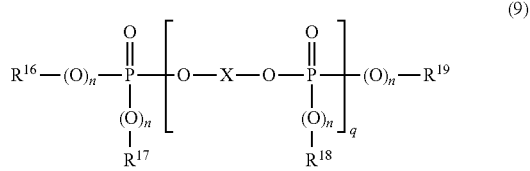

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (9) is a mono- or poly-nuclear aromatic $C_{6-30}$ moiety derived from a diphenol. Further in formula (9), n is each independently 0 or 1; in some embodiments n is equal to 1. Also in formula (9), q is from 0.5 to 30, from 0.8 to 15, from 1 to 5, or from 1 to 2. Specifically, X can be represented by the following divalent groups (9), or a combination comprising one or more of these divalent groups.

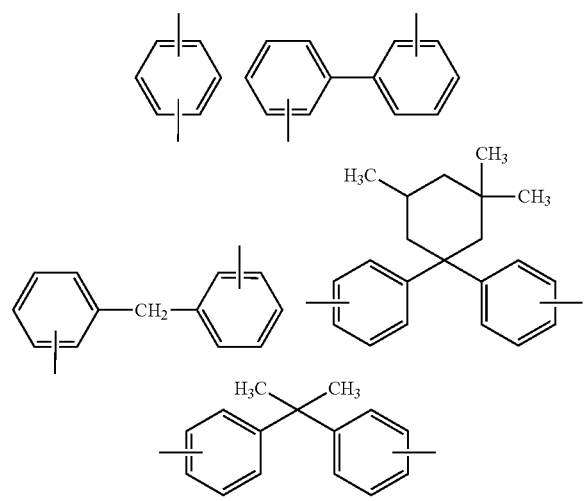

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R^{17}$, $R^{18}$, $R^{19}$ is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (10)

(10)

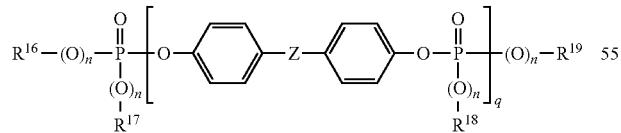

wherein $R^{16}$, $R^{17}$, $R^{18}$, $R^{19}$, n, and q are as defined for formula (9) and wherein Z is $C_{1-7}$ alkylidene, $C_{1-7}$ alkylene, $C_{5-12}$ cycloalkylidene, —O—, —S—, —SO_2—, or —CO—, specifically isopropylidene. A specific aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (11) and cyclic phosphazenes (12)

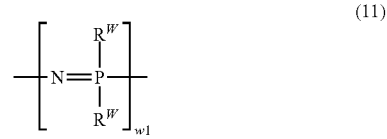

(11)

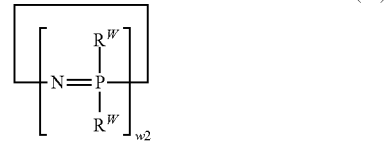

(12)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Depending on the particular organophosphorus compound used, the thermoplastic compositions can comprise 0.5 to 15 wt % or 3.5 to 12 wt % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination thereof.

The thermoplastic compositions can further comprise a cyclic siloxane and/or a linear siloxane to impart fire/flame-retardant properties. The cyclic siloxane can include those with the general formula below

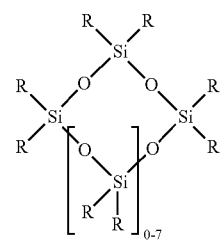

wherein each R in the cyclic siloxane is independently $C_{1-36}$ alkyl, fluorinated or perfluorinated $C_{1-36}$ alkyl, $C_{1-36}$ alkoxy, $C_{6-14}$ aryl, aryloxy of 6 to 14 carbon atoms, arylalkoxy of 7 to 36 carbon atoms, or $C_{1-3}6$ alkyl-substituted aryl of 6 to 14 carbon atoms. In an embodiment, at least one R can be a phenyl. Examples of cyclic siloxanes include, but not limited to, a cyclic phenyl containing siloxane, octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane. Octaphenylcyclotetrasiloxane is specifically mentioned.

Linear siloxanes can also be used. The linear siloxanes can be a linear phenyl containing siloxane such as a poly (phenylmethylsiloxane). In an embodiment, the thermoplastic compositions contain 0.01% to 1% of a cyclic siloxane, a linear siloxane, or a combination thereof.

The thermoplastic compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

In certain embodiments, the thermoplastic compositions can have a low residual impurity content, in particular less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. It is to be understood that the foregoing residual impurities can exist in the thermoplastic compositions in un-ionized form (for example as triethylamine or formic acid), but are determined based on their ionized form.

The thermoplastic compositions can be molded under standard molding conditions in range of 300 to 350° C. depending on the glass transition temperature of the composition. For example, the thermoplastic compositions can be molded at a temperature of 100 to 175° C. above the glass transition temperature of the thermoplastic composition for a residence time of 2 to 20 minutes.

The thermoplastic compositions can have a glass transition temperature of 155° C. or higher, preferably 155° C. to 280° C., more preferably 165 to 260° C., and even more preferably 185 to 230° C., determined by differential scanning calorimetry (DSC) as per ASTM D3418 with a 20° C./min heating rate.

The thermoplastic compositions can have a heat deflection temperature of 160° C. or higher as measured on a 80×10×4 mm bar with a 64 mm span at 0.45 MPa according to ISO 75/Bf.

The thermoplastic compositions can have excellent transparency. In an embodiment, the thermoplastic compositions can have a haze less of less than 15%, more preferably less than 10%, more preferably less than 5%, even more preferably less than 1.5%, or less than 1.0%, and a transmission greater than 86%, more preferably greater than 87%, even more preferably greater than 88%, even more preferably greater than 90% each measured according to ASTM D1003-00 on a molded plaque with a 1.0 mm thickness. In another embodiment, the thermoplastic compositions can have a haze of less than 15%, more preferably less than 10%, more preferably less than 5%, even more preferably less than 1.5%, or less than 1.0% and a total transmission greater than 84% or greater than 86%, each measured according to ASTM D1003-00 on a molded plaque with a 3.0 mm thickness.

The thermoplastic compositions can have a transmission at wavelength of 400 nm of greater than 75%, or greater than 80% or greater than 85% measured with Perkin Elmer 950 spectrometer equipped with 15 cm integrated sphere on a molded plaque with a thickness of 1 mm.

The thermoplastic compositions can have a transmission at wavelength of 550 nm of greater than 85%, or greater than 87% or greater than 88% measured with Perkin Elmer 950 spectrometer equipped with 15 cm integrated sphere on a molded plaque with a thickness of 1 mm.

The thermoplastic compositions can have excellent transparency in the infrared wavelength range. In an embodiment, the compositions have a transmission at wavelength of 940 nm of greater than 88.0%, preferably greater than 89.0%, more preferably greater than 90.0%, as measured with Perkin Elmer 950 spectrometer equipped with 15 cm integrated sphere on 1 mm.

In still another embodiment, the thermoplastic compositions can have a refractive index of greater than 1.59 or greater than 1.60 at 587.6 nm or a refractive index of greater than 1.57 or greater than 1.58 at 940 nm measured according to ISO 489 on a molded plaque with a thickness of 1 mm.

The thermoplastic compositions can have an Abbe number of less than 32 or less than 30 measured according to ISO 489 on a molded plaque with a thickness of 1 mm.

The thermoplastic compositions can have excellent color after molding under demanding conditions. In an embodiment, the thermoplastic compositions have a YI of less than 12, preferably less than 8, more preferably less than 6 as measured by ASTM D1925 on a 2.5 mm plaque. For example, the thermoplastic compositions are molded at a temperature of 100 to 175° C. above the glass transition temperature of the thermoplastic composition for a residence time of 2 to 20 minutes. Typical conditions would be molding at melt temperatures of 350° C. or higher and residence times of 3 minutes or longer. In a specific embodiment, the thermoplastic compositions have a YI of less than 12, preferably less than 8, more preferably less than 6 measured according to ASTM D1925 on a plaque of 2.5 mm thickness molded at a temperature of 355° C. for a residence time of 10 minutes.

The thermoplastic compositions have excellent color stability during exposure for prolonged time at elevated temperatures in the absence of moisture, referred to further as heat ageing. The thermoplastic compositions can have an increase in YI of less than 5, more preferably less than 4, more preferably less than 3, during 1500 hours of heat aging at 140° C., as measured by ASTM D1925 on a 1.0 mm thick molded plaque. In an embodiment, the thermoplastic compositions can have an increase in YI of less than 10, more preferably less than 8, more preferably less than 6, during 1500 hours of heat aging at 155° C., as measured by ASTM D1925 on a 1.0 mm thick molded plaque. In another embodiment, the thermoplastic compositions can have an increase in YI of less than 20, more preferably less than 10, more preferably less than 5, during 1000 hours of heat aging at 160° C., as measured by ASTM D1925 on a 2.5 mm thick molded plaque. In still another embodiment, the thermoplastic compositions can have an increase in YI of less than 20, more preferably less than 10, more preferably less than 5, during 500 hours of heat aging at 170° C., as measured by ASTM D1925 on a 2.5 mm thick molded plaque.

The thermoplastic compositions have excellent color stability during exposure for prolonged time at elevated temperatures in the presence of moisture, referred to herein as hydroaging. In an embodiment, the thermoplastic compositions can have an increase in YI of less than 5, more preferably less than 3, more preferably less than 1, after 1000 hours of hydroaging at 80° C. and 85% relative humidity, as measured by ASTM D1925 on a 2.5 mm thick molded plaque. Alternatively, the thermoplastic compositions can have an increase in YI of less than 0.5, or of less than 0.3 after 100 hours of hydroaging at 121° C. in an autoclave, as measured by ASTM D1925 on a 2.5 mm thick molded plaque.

The thermoplastic compositions have excellent color stability during exposure for prolonged time to autoclave conditions or multiple cycle of autoclave sterilization. In an embodiment, the thermoplastic compositions have an increase in YI of less than 2, more preferably less than 1, after 100 hours of autoclaving at 121° C., as measured by ASTM D1925 on a 2.5 mm thick molded plaque. In an embodiment, the thermoplastic compositions have an increase in YI of less than 5, more preferably less than 3, more preferably less than 1, after 100 hours of autoclaving at 134° C., as measured by ASTM D1925 on a 2.5 mm thick molded plaque. In another embodiment, the thermoplastic compositions have an increase in YI of less than 10, more preferably less than 5, more preferably less than 3, after 100 hours of autoclaving at 143° C., as measured by ASTM D1925 on a 2.5 mm thick molded plaque.

In another embodiment, the thermoplastic compositions can have an increase in yellowness index of less than 10, or of less than 8 after 500 hours of heat aging at 155° C., as measured by ASTM D1925 on a 2.5 mm thick molded plaque; or an increase in yellowness index of less than 10, or of less than 8 during 1000 hours of heat aging at 155° C., as measured by ASTM D1925 on a 1.0 mm thick molded plaque.

In another embodiment, the thermoplastic compositions can have an increase in YI of less than 6, or of less than 5 during 1500 hours of heat aging at 140° C., as measured by ASTM D1925 on a 1.0 mm thick molded plaque.

The thermoplastic compositions can have a melt volume flow rate (MVR) greater than 10 cc/min, measured at 330° C./2.16 Kg at 360 second dwell according to ISO 1133.

The thermoplastic compositions can have an Izod notched impact energy of at least 6 kJ/m$^2$, or of at least 8 kJ/m$^2$, as measured at 23° C. according to ISO 180/1A using a multipurpose test specimen in accordance with ISO 3167 TYPE A. The thermoplastic compositions can have an Izod notched impact energy of at least 70 J/m, or of at least 88 J/m, as measured at 23° C. according to ASTM D256.

The thermoplastic compositions can have a UL94-V0 rating at a thickness of 2.5 mm or higher, for example up to 5.0 mm. The thermoplastic compositions can have a UL94-V2 rating at a thickness of 0.8 mm to 2.5 mm.

Shaped, formed, or molded articles comprising the thermoplastic compositions are also provided. The compositions can be molded into useful shaped articles by a variety of methods, such as injection molding, injection-compression molding, heat-cool molding, extrusion, rotational molding, blow molding, and thermoforming. The article can be a molded article, a thermoformed article, an extruded article, an extruded layer (a film or a sheet), one or more layers of a multi-layer article, a substrate for a coated article, or a substrate for a metallized article made from the thermoplastic composition. The multi-layer article can be a laminated multi-layer article. The distinction between a film and a sheet is not critical. A film can have an exemplary thickness of 100 micrometers to 5 millimeter, and the sheet can have an exemplary thickness of 5 millimeters to 5 centimeters.

Advantageously, the articles have no significant part distortion or discoloration when the articles are subjected to a secondary operation such as over-molding, lead-free soldering, wave soldering, low temperature soldering, or coating with high temperature curing, or a combination thereof. High temperature cure of the coating can be, for example, 100° C. or higher, for example 100 to 250° C. In some embodiments, "no significant part distortion" includes a volume distortion of less than 10 volume percent (vol %), or less than 5 vol %, or less than 1 vol %. Significant discoloration can be detected by the unaided eye at a distance of 18 inches.

In some embodiments, at least a portion of a surface of the article is metallized or is coated with a hardcoat, a UV-protective coat, an anti-refractive coat, an anti-reflective coat, a scratch-resistant coat, or a combination comprising at least one of the foregoing. In some embodiments, the coating is applied or cured at a temperature of 100° C. or higher, for example 100 to 250° C.

The article can be a lens (e.g., a camera lens, a mobile phone camera lens, a table camera lens, a security camera lens, an automotive camera lens, a scanner lens, a copier lens, an illumination device lens, a safety glass lens, an ophthalmic corrective lens, a projector lens, an imaging lens, an auto lens, a sensor lens (for example a proximity sensor lens, a gesture control lens, or an infrared sensor lens)), a light guide, a waveguide, a collimator, an optical fiber, a visor, a window, a door, a display screen, an electronic device, a scientific or medical device (e.g., a blood bag, a solution bag, an intravenous connector, a catheter, a medical storage tray, medical tubing, a cannula, an implantable prosthesis, a heart valve, a vascular graft, a pacemaker lead, a defibrillator lead, an A-V shunt, a Petri dish), a safety shield, a fire shield, wire or cable sheathing, a tray, a screen, an enclosure, a dish, glazing, packaging, a gas barrier, an anti-fog layer, or an anti-reflective layer.

In addition, the copolycarbonate compositions can be used as a component of a wide variety of devices and applications, for example a component of a device comprising a lens, such as a camera, a mobile phone camera, a flashlight, a sensor such as a touch sensor, a proximity sensor, a gesture control sensor, or an infrared sensor, ophthalmic corrective glasses, safety glasses, an illumination device, a lighthouse, a light emitting diode (LED), or a vehicle (e.g., a lens holder, a reflector, a camera flash lens, a vehicle headlight, running light, foglight, or rearlight). As used herein a "vehicle" refers to any transportation device, for example bicycles, scooters, motorcycles, automobiles, buses, trains, boats, ships, and aircraft.

Other articles include a device comprising a light guide, a device comprising a waveguide, a device comprising a collimator, a device comprising an optical fiber, a device comprising an optical film, a device comprising a device comprising a lighting element, including LEDs and OLEDs (e.g., a light bulb, a housing, a cover, a bezel, a vehicle headlight, running light, foglight, or rearlight, a flashlight, a reflector, or a signal indicator), a device comprising a window, such as a domestic appliance, vehicle, or building, an device comprising a door, such as a domestic appliance, vehicle, or building, or a device comprising a tray (e.g., a food tray for a vehicle).

Still other articles include a component of a scientific or medical device (e.g., a syringe, a blood filter housing, a blood bag, a solution bag, an intravenous connector, a dialyzer, a catheter, a medical storage tray, a medical appliance, medical tubing, a cardiac pacemaker, a cardiac defibrillator, a cannula, an implantable prosthesis, a cardiac assist device, a heart valve, a vascular graft, an extracorporeal device, an artificial organ, a pacemaker lead, a defibrillator lead, a blood pump, a balloon pump, an A-V shunt, a membrane for cell encapsulation, a wound dressing, an artificial joint, an orthopedic implant a Petrie dish, a face shield, a respirator, a sensor), a component of an electronic device such as a handheld electronic device, a tablet, a computer, a monitor, a business machine such as a copier, a fuse, an analytical device, or a sensor (e.g., a housing, an electrical connector, for any of the foregoing), a component of a photovoltaic device, a component of a safety device (e.g., a visor, a safety goggle, a face shield, a fire shield, a helmet, a respirator, a knee pad, elbow pad, or other protective body part pad), a component of a display screen, including a liquid crystal display screen, or an organic light-emitting diode display screen, a component of a dish, a component of a heater, such as a watercooker, a component of a mold, for example for foodstuffs such as chocolate, a component of a screen such as a mining ore screen, a component of a conveyor such as a conveyor belt, a component of an enclosure such as an animal cage, a structural component of a building, a vehicle, or an appliance such as a pump, a microwave, a dishwasher, or a stove, a component of packaging, a component of a gas barrier, a component of an encapsulant, a component of a label, a component of a gas barrier, a component of an anti-fog assembly, or a component of an anti-reflective assembly.

The invention is further illustrated by the following non-limiting examples.

EXAMPLES

The materials used in the Examples are described in Table 1.

TABLE 1

| Component | Chemical Description | Source |
|---|---|---|
| CPC-1 | PPP-BP (N-phenylphenolphthaleinyl bisphenol, 2,2-bis(4-hydro)-bisphenol A polycarbonate copolymer, 33 mol % PPP-BP, Mw = 21-25 kDa as determined by GPC using bisphenol A polycarbonate standards, para-cumylphenol (PCP) end-capped, with BPA carbonate units derived from BPA having 99.4-99.5% purity | SABIC |
| CPC-2 | PPP-BP (N-phenylphenolphthaleinyl bisphenol, 2,2-bis(4-hydro)-Bisphenol A polycarbonate copolymer, 33 mol % PPP-BP, Mw = 21-25 kDa as determined by GPC using bisphenol A polycarbonate standards, para-cumylphenol (PCP) end-capped, with BPA carbonate units derived from BPA having 99.7% purity | SABIC |
| PC-1 | Linear bisphenol A polycarbonate, produced via interfacial polymerization from BPA having 99.4-99.5% purity as determined by HPLC, Mw = 29-32 kDa as determined by GPC using bisphenol A polycarbonate standards, phenol end-capped | SABIC |
| PC-2 | Linear Bisphenol A Polycarbonate, produced via interfacial polymerization, Mw of about 21,800 g/mol as determined by GPC using polycarbonate standards, para-cumylphenol (PCP) end-capped with BPA carbonate units derived from BPA having 99.4-99.5% purity as determined by HPLC | SABIC |
| PC-3 | Linear bisphenol A polycarbonate, produced via interfacial polymerization from BPA having 99.7% purity as determined by HPLC, Mw = 29-32 kDa as determined by GPC using bisphenol A polycarbonate standards, phenol end-capped | SABIC |
| PC-4 | Linear Bisphenol A Polycarbonate, produced via interfacial polymerization, Mw of about 21,800 g/mol as determined by GPC using polycarbonate standards, para-cumylphenol (PCP) end-capped with BPA carbonate units derived from BPA having 99.7% purity as determined by HPLC | SABIC |
| PC-5 | Linear Bisphenol A Polycarbonate, produced via interfacial polymerization, Mw of about 35,000 g/mol as determined by GPC using polycarbonate standards, phenol end-capped with BPA carbonate units derived from BPA having 99.7% purity as determined by HPLC | SABIC |
| Tosylate Premix-1 | Premix of 0.06 wt % of butyl tosylate (source Aldrich) in PC-2 | SABIC |
| Tosylate Premix-2 | Premix of 0.3 wt % of butyl tosylate (source Aldrich) in PC-2 | SABIC |
| Tosylate Premix-3 | Premix of 0.4 wt % of butyl tosylate(source Aldrich) in PC-2 | SABIC |
| P-TSA premix | Premix of 0.34 wt % of polystyrene sulfonic acid (source Aldrich) in PC-2 | SABIC |
| Et Tosylate premix | Premix of 0.35 wt % of ethyl p-toluene sulfonate (source Aldrich) in PC-2 | SABIC |
| Poly p-TSA premix | Premix of 0.34 wt % of polystyrene sulfonic acid (source Aldrich) in PC-2 | SABIC |
| OD p-TS premix | Premix of 0.74 wt % of octadecyl p-toluenesulfonate (source TCI) in PC-2 | SABIC |
| p-TSAA premix | Premix of 0.28 wt % of p-toluenesulfonic anhydride (source Aldrich) in PC-2 | SABIC |
| 4-DBSA premix | Premix of 0.57 wt % of 4-dodecylbenzenesulfonic acid (source Aldrich) in PC-2 | SABIC |
| p-TSA Na premix | Premix of 0.34 wt % of sodium p-toluenesulfonate (source Aldrich) in PC-2 | SABIC |

TABLE 1-continued

| Component | Chemical Description | Source |
|---|---|---|
| 10-CSA premix | Premix of 0.41 wt % of 10-camphorsulfonic acid (source Aldrich) in PC-2 | SABIC |
| Ph Tosylate premix | Premix of 0.44 wt % of phenyl p-toluenesulfonate (source TCI) in PC-2 | SABIC |
| AO-1 | Tris(2,4-di-t-butylphenyl)phosphite (IRGAFOS 168) | Ciba |
| AO-2 | Octadecyl-3-(3,5-di-tert-butyl-4-hydroxyphenyl) propionate IRGANOX 1076 | BASF |
| PETS | Palmitic/stearic acid (50/50) ester of dipenta/pentaerythritol (Loxiol EP8578) | Cognis Oleochemicals |
| $H_3PO_3$ Premix | Premix of 0.626 wt % of a 45 wt % phosphorous acid aqueous solution in PC-1 | SABIC |
| UVA 234 | 2-[2-hydroxy-3,5-di-(1,1-dimethylbenzyl)]-2H-benzotriazol | BASF |
| UVA 5411 | 2-(2H-benzotriazol-2-yl)-4-(1,1,3,3-tetramethylbutyl)phenol | CYTEC |
| Epoxy | Styrene-acrylate-epoxy oligomer | BASF |
| Rimar salt | potassium perfluorobutane sulfonate | 3M |

Blending, Extrusion, and Molding Conditions

The compositions were made as follows. All solids were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid additives, if any, were fed before the vacuum using a liquid injection system. It will be recognized by one skilled in the art that the method is not limited to these processing steps or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3), and 290 to 330° C. (zone 4 to 8). Screw speed was 300 rpm and throughput was between 10 and 25 kg/hr. Examples 85 to 101 were extruded on a different machine and conditions. Extrusion of these materials was performed on a 26 mm Toshiba TEM26SS single-screw extruder (L/D ratio of 40.41) with a vacuum port located near the die face. The extruder has 10 zones, which were set at temperatures of 40° C. (feed zone), 200° C. (zone 1), 250° C. (zone 2), 270° C. (zone 3), and 290 to 330° C. (zone 4 to 8). Screw speed was 300 rpm and throughput was between 30 and 35 kg/hr.

Samples of the compositions were molded after drying at 100 to 110° C. for 6 hours on a 45-ton Engel molding machine with 22 mm screw or 75-ton Engel molding machine with 30 mm screw operating at a temperature 310 to 360° C. with a mold temperature of 80 to 150° C. with a typical residence between 3 and 15 minutes. Examples 85 to 101 were molded on a different machine and conditions. For these samples, molding was done on a 85-ton JSW J85AD molding machine with 25 mm operating at a temperature 310 to 360° C. with a mold temperature of 80 to 150° C. with a typical residence between 3 and 15 minutes.

Testing Methods

Yellowness Index (YI) was calculated from the transmission spectrum from a MacBeth ColorEye7000A according to ASTM D1925. Parts with thickness of 1 mm or 2.5 mm were used, as specified in the Examples Tensile stress and tensile modulus were measured in accordance with ISO 527 with speed of 50 mm/min Flexural stress and flexural modulus were measured in accordance with ISO 178.

ASTM Izod notched impact energy was as measured at 23° C. according to ASTM D256 using a 80 mm×10 mm×4 mm specimen.

ISO notched Izod impact was measured at 23° C. according to ISO 180/1A using a multipurpose test specimen in accordance with ISO 3167 TYPE.

A Vicat B120 softening temperature was measured according to ISO 306.

Heat deflection temperature (HDT) was measured flat on a 80 mm×10 mm×4 mm bar with a 64 mm span at 0.45 MPa according to ISO 75/Bf.

Melt volume flow rate (MVR) was measured at 330° C./2.16 Kg at 300 second dwell according to ISO 1133.

Transmission at 400 nm, 550 nm, 940 nm, or 1310 nm was measured with Perkin Elmer 950 spectrometer equipped with 15 cm integrated sphere on a molded plaque with a thickness of 1 mm, 2 mm, or 3 mm.

Haze was measured according to ASTM D1003-00 on a molded plaque with thickness of 1 to 3 mm.

Refractive index was measured according to ISO 489 on a molded plaque with a thickness of 1 mm.

Abbe number was measured according to ISO 489 on a molded plaque with a thickness of 1 mm.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, UL94 V0, V1, V2, VA, and/or VB.

Examples 1-14

Examples 1-14 demonstrate the effect of the addition of butyl tosylate on the color of PPPBP-BPA copolycarbonate/BPA homopolycarbonate blends, based on polymers produced using BPA with 99.4 to 99.5% purity, with and without ultraviolet light stabilizers after the blends are molded under different conditions. Formulations and results are shown in Tables 2 and 3, where the formulations in Table 2 do not contain any ultraviolet light stabilizer while the formulations in Table 3 contain an ultraviolet light stabilizer. All YI measurements were performed on 2.5 mm thick plaques molded per conditions as specified in Table 2.

TABLE 2

|  | Unit | CEx1 | Ex2 | Ex3 | Ex4 | Ex5 | Ex6 | CEx7 |
|---|---|---|---|---|---|---|---|---|
| Component |  |  |  |  |  |  |  |  |
| CPC-1 | Wt % | 63.70 | 63.70 | 63.70 | 63.70 | 63.70 | 63.70 | 63.7 |
| PC-1 | Wt % | 11.30 | 11.30 | 11.30 | 11.30 | 11.30 | 11.30 | 11.3 |
| PC-2 | Wt % | 24.58 | 24.25 | 23.91 | 23.58 | 22.91 | 22.08 | 24.5 |
| PETS | Wt % | 0.30 | 0.30 | 0.30 | 0.30 | 0.30 | 0.30 | 0.3 |
| AO-1 | Wt % | 0.08 | 0.08 | 0.08 | 0.08 | 0.08 | 0.08 | 0.08 |
| AO-2 | Wt % | 0.04 | 0.04 | 0.04 | 0.04 | 0.04 | 0.04 | 0.04 |
| Tosylate premix-1 | Wt % |  | 0.33 | 0.67 | 1.00 | 1.67 | 2.50 |  |
| $H_3PO_3$ Premix | Wt % |  |  |  |  |  |  | 0.11 |
| Total | Wt % | 100 | 100 | 100 | 100 | 100 | 100 | 100 |
| Sulfonic stabilizer content | ppm | 0 | 2 | 4 | 6 | 10 | 15 |  |
| $H_3PO_3$ content | ppm |  |  |  |  |  |  | 3 |
| Property |  |  |  |  |  |  |  |  |
| YI after molding at 310° C./5 min |  | 2.1 | 2.1 | 2.1 | 2.1 | 2.1 | 2.1 | 1.94 |
| YI after molding at 335° C./10 min |  | 9.7 | 3.1 | 2.6 | 2.7 | 2.7 | 2.7 | 4.99 |
| YI after molding at 355° C./5 min |  | 8.9 | 3.6 | 3 | 2.8 | 2.7 | 2.7 |  |
| YI after molding at 355° C./10 min |  | 18.9 | 8.9 | 6.1 | 5.7 | 5.0 | 5 | 16.57 |
| YI after molding at 355° C./15 min |  | 25.2 | 14.1 | 9.5 | 9.7 | 7.9 | 7.9 |  |
| YI improvement* at 310° C./5 min | % | — | 0 | 0 | 0 | 0 | 0 | −8 |
| YI improvement* at 335° C./10 min | % | — | −68 | −73 | −72 | −72 | −72 | −49 |
| YI improvement* at 355° C./5 min | % | — | −60 | −66 | −69 | −70 | −70 | NA |
| YI improvement* at 355° C./10 min | % | — | −53 | −68 | −70 | −74 | −74 | −12 |
| YI improvement* at 355° C./15 min | % | — | −44 | −62 | −62 | −69 | −69 | NA |

*Vs. CEx1

TABLE 3

|  | Unit | CEx8 | Ex9 | Ex10 | Ex11 | Ex12 | Ex13 | CEx14 |
|---|---|---|---|---|---|---|---|---|
| Component |  |  |  |  |  |  |  |  |
| CPC-1 | Wt % | 63.70 | 63.70 | 63.70 | 63.70 | 63.70 | 63.70 | 63.7 |
| PC-1 | Wt % | 11.30 | 11.30 | 11.30 | 11.30 | 11.30 | 11.30 | 11.3 |
| PC-2 | Wt % | 24.28 | 23.95 | 23.61 | 23.28 | 22.61 | 21.78 | 24.2 |
| PETS | Wt % | 0.30 | 0.30 | 0.30 | 0.30 | 0.30 | 0.30 | 0.3 |
| AO-1 | Wt % | 0.08 | 0.08 | 0.08 | 0.08 | 0.08 | 0.08 | 0.08 |
| AO-2 | Wt % | 0.04 | 0.04 | 0.04 | 0.04 | 0.04 | 0.04 | 0.04 |
| UVA 234 | Wt % | 0.30 | 0.30 | 0.30 | 0.30 | 0.30 | 0.30 | 0.3 |
| Tosylate premix-1 | Wt % | 0.00 | 0.33 | 0.67 | 1.00 | 1.67 | 2.50 |  |
| $H_3PO_3$ Premix |  |  |  |  |  |  |  | 0.11 |
| Total | Wt % | 100 | 100 | 100 | 100 | 100 | 100 |  |
| Organosulfonic content | ppm | 0 | 2 | 4 | 6 | 10 | 15 |  |
| $H_3PO_3$ content | ppm |  |  |  |  |  |  | 3 |
| Property |  |  |  |  |  |  |  |  |
| YI after molding at 310° C./5 min |  | 3.2 | 3.0 | 3 | 3 | 2.9 | 2.9 | 2.8 |
| YI after molding at 335° C./10 min |  | 10.4 | 4.4 | 4 | 3.7 | 3.6 | 3.7 | 3.7 |
| YI after molding at 355° C./5 min |  | 10.5 | 4.2 | 4.1 | 3.9 | 3.6 | 3.7 |  |
| YI after molding at 355° C./10 min |  | 19.8 | 8.6 | 6.9 | 6.8 | 5.4 | 5.7 | 10.4 |
| YI after molding at 355° C./15 min |  | 26.7 | 14.3 | 10.3 | 11 | 7 | 7.7 |  |
| YI improvement* at 310° C./5 min | % | — | −6 | −6 | −6 | −9 | −9 | −13 |
| YI improvement* at 335° C./10 min | % | — | −58 | −62 | −64 | −65 | −64 | −64 |
| YI improvement* at 355° C./5 min | % | — | −60 | −61 | −63 | −66 | −65 |  |
| YI improvement* at 355° C./10 min | % | — | −57 | −65 | −66 | −73 | −71 | −47 |
| YI improvement* at 355° C./15 min | % | — | −46 | −61 | −59 | −74 | −71 |  |

*vs CEx8

The data in Tables 2 and 3 indicates that the addition of as little as 2 ppm of butyl tosylate significantly improves YI when the blends are molded at 335 to 355° C. for 5 to 15 minutes compared to a reference that does not contain the tosylate regardless whether an ultraviolet light stabilizer is present (CEx8) or not (CEx1). The improvement on color is more pronounced when the blends are molded at higher temperatures for longer time. Generally increasing the amount of butyl tosylate to up to 15 ppm further improves the color stability of the blends, comparing for instance Examples 3-6 with Example 2, and comparing Examples 10-13 with Example 9. Loadings of 4 ppm of butyl tosylate are desired for better color, higher than 6 ppm of loading provides further improved color. Typically color improvements of 50% or higher, or 60% or higher are achieved compared to the reference composition not containing the butyl tosylate at 335 or 355° C.

The data also shows that $H_3PO_3$ is far less efficient in improving the color of the PPPBP-BPA copolycarbonate/BPA homopolycarbonate blends after abusive molding as compared to butyl tosylate, especially at most abusive conditions at melt temperature of 355° C.

Examples 15-19

Examples 15-19 compare the color stability of high purity PPPBP-BPA copolycarbonate/BPA homopolycarbonate blends that contain butyl tosylate, $H_3PO_3$, or citric acid after samples are molded under various process conditions at a thickness of 2.5 mm. Formulations and results are shown in Table 4.

TABLE 4

|  | Unit | CEx15 | CEx17 | Ex18 | CEx19 |
|---|---|---|---|---|---|
| Component |  |  |  |  |  |
| CPC-2 | Wt % | 44.8 | 44.8 | 44.88 | 44.8 |
| PC-3 | Wt % | 8.69 | 8.685 | 8.68 | 8.67 |
| PC-5 | Wt % | 46.09 | 46.09 | 46.09 | 46.09 |
| PETS | Wt % | 0.3 | 0.3 | 0.3 | 0.3 |
| AO-1 | Wt % | 0.08 | 0.08 | 0.08 | 0.08 |
| AO-2 | Wt % | 0.04 | 0.04 | 0.04 | 0.04 |
| $H_3PO_3$ Premix |  |  | 0.11 |  |  |
| Tosylate Premix-1 | Wt % |  |  | 0.067 |  |
| Citric acid | Wt % |  |  |  | 0.01 |
| Total | Wt % | 100 | 100 | 100 | 100 |
| Property |  |  |  |  |  |
| YI after molding at 290° C./5 min |  | 1.9 | 1.7 | 1.8 | 4 |
| YI after molding at 290° C./10 min |  | 1.8 | 1.6 | 1.9 | 5.6 |
| YI after molding at 340° C./5 min |  | 3.2 | 2.6 | 2.1 | 16 |
| YI after molding at 340° C./10 min |  | 8.9 | 4.5 | 2.9 | 23.6 |
| YI improvement vs CEx15 at 290° C./5 min | % | — | −11 | −5 | 111 |
| YI improvement vs CEx15 at 290° C./10 min | % | — | −11 | 6 | 211 |
| YI improvement vs CEx15 at 340° C./5 min | % | — | −19 | −34 | 400 |
| YI improvement vs CEx8 at 340° C./10 min | % | — | −49 | −67 | 165 |

The data in Table 4 shows that the addition of butyl tosylate significantly improves YI of blends containing a high purity PPPBP-BPA copolycarbonate and a BPA homopolycarbonate when the blends are molded at 340° C. for 10 minutes compared to a control that does not contain any organosulfonic stabilizer (CEx15), or reference blends either contain phosphoric acid (CEx17) or citric acid (CEx19).

Examples 20-35

Examples 20-35 illustrate the effects of butyl tosylate on the color of blends containing PPPBP-BPA copolycarbonate and a BPA homopolycarbonate having various BPA purities (STD=99.4-99.5% purity, HP=99.7% purity) after the samples are molded under various processing conditions. Formulations and results are shown in Tables 5 and 6.

TABLE 5

|  | CEx20 | Ex21 | Ex22 | Ex23 | CEx24 | Ex25 | Ex26 | Ex27 |
|---|---|---|---|---|---|---|---|---|
| Component (wt %) |  |  |  |  |  |  |  |  |
| CPC-1 | 63.7 | 63.7 | 63.7 | 63.7 |  |  |  |  |
| CPC-2 |  |  |  |  | 63.7 | 63.7 | 63.7 | 63.7 |
| PC-1 | 24.6 | 23.3 | 23.0 | 22.6 | 24.6 | 23.3 | 23.0 | 22.6 |
| PC-2 | 11.3 | 11.3 | 11.3 | 11.3 | 11.3 | 11.3 | 11.3 | 11.3 |
| PETS | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 |
| UVA 234 | 0.3 | 0.3 | 0.3 | 0.3 | 0.3 | 0.3 | 0.3 | 0.3 |
| Tosylate premix-1 | 0 | 1.00 | 1.33 | 1.67 | 0 | 1.00 | 1.33 | 1.67 |
| Total | 100 | 100 | 100 | 100 | 100 | 100 | 100 | 100 |
| Sulfonic content (ppm) | 0 | 6 | 8 | 10 | 0 | 6 | 8 | 10 |

TABLE 5-continued

|  | CEx20 | Ex21 | Ex22 | Ex23 | CEx24 | Ex25 | Ex26 | Ex27 |
|---|---|---|---|---|---|---|---|---|
| CPC/PC purity | STD/STD | STD/STD | STD/STD | STD/STD | HP/STD | HP/STD | HP/STD | HP/STD |
| Property |  |  |  |  |  |  |  |  |
| YI after molding* |  |  |  |  |  |  |  |  |
| at 310° C./5 min | 3.1 | 3.0 | 3.0 | 3.0 | 3.3 | 3.2 | 3.1 | 3.2 |
| at 335° C./10 min | 8.6 | 3.6 | 3.7 | 3.7 | 8.2 | 3.8 | 3.7 | 3.6 |
| at 355° C./10 min | 20.7 | 6.1 | 6.1 | 5.1 | 16.6 | 6.0 | 5.5 | 6.5 |
| YI improvement at 310° C./5 min | — | −3** | −3** | −3** | — | −3*** | −6*** | −3*** |
| YI improvement at 335° C./10 min | — | −58** | −57** | −57** | — | −54*** | −55*** | −56*** |
| YI improvement at 355° C./10 min | — | −71** | −71** | −75** | — | −64*** | −67*** | −61*** |

*2.5 mm sample
**vs. CEx20
***vs. CEx24

TABLE 6

|  | CEx28 | Ex29 | Ex30 | Ex31 | CEx32 | Ex33 | Ex34 | Ex35 |
|---|---|---|---|---|---|---|---|---|
| Component (wt %) |  |  |  |  |  |  |  |  |
| CPC-1 | 63.7 | 63.7 | 63.7 | 63.7 |  |  |  |  |
| CPC-2 |  |  |  |  | 63.7 | 63.7 | 63.7 | 63.7 |
| PC-3 | 24.6 | 23.3 | 23.0 | 22.6 | 24.6 | 23.3 | 23.0 | 22.6 |
| PC-4 | 11.3 | 11.3 | 11.3 | 11.3 | 11.3 | 11.3 | 11.3 | 11.3 |
| PETS | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 |
| UVA 234 | 0.3 | 0.3 | 0.3 | 0.3 | 0.3 | 0.3 | 0.3 | 0.3 |
| Tosylate premix-1 | 0 | 1.00 | 1.33 | 1.67 | 0 | 1.00 | 1.33 | 1.67 |
| Total | 100 | 100 | 100 | 100 | 100 | 100 | 100 | 100 |
| Sulfonic content (ppm) | 0 | 6 | 8 | 10 | 0 | 6 | 8 | 10 |
| CPC/PC purity | STD/HP | STD/HP | STD/HP | STD/HP | HP/HP | HP/HP | HP/HP | HP/HP |
| Property |  |  |  |  |  |  |  |  |
| YI after molding* |  |  |  |  |  |  |  |  |
| at 310° C./5 min | 3.4 | 3.0 | 3.0 | 3.1 | 3.9 | 3.3 | 3.2 | 3.1 |
| at 335° C./10 min | 8.7 | 3.8 | 3.6 | 3.6 | 8.3 | 3.9 | 3.6 | 3.3 |
| at 355° C./10 min | 18.5 | 5.6 | 4.8 | 4.9 | 18.3 | 6.5 | 5.9 | 4.7 |
| YI improvement at 310° C./5 min | — | −12** | −12** | −9** | — | −15*** | −18*** | −21*** |
| YI improvement at 335° C./10 min | — | −56** | −59** | −59** | — | −53*** | −57*** | −60*** |
| YI improvement at 355° C./10 min | — | −70** | −74** | −74** | — | −64*** | −68*** | −74*** |

*2.5 mm sample
**vs. CEx28
***vs. CEx32

The data in Tables 5 and 6 shows that adding butyl tosylate to PPPBP-BPA copolycarbonate/BPA homopolycarbonate blends improves the abusive YI (335° C./10 minutes and 355° C./10 minutes) for any BPA purity in the copolycarbonate and the homopolycarbonate, using any combination of standard and high purity resins, comparing for instance Ex21, Ex25, Ex29 and Ex33 (all containing 6 ppm butyl tosylate) with CEx20, CEx24, CEx28 and CEx32 respectively (same composition, but without the butyl tosylate), achieving YI reductions versus the comparative examples of 50-75%. The data also indicates that loadings of 6-10 ppm of butyl tosylate provide similar results in color stability, all achieving comparable improvements.

Examples 36-47

Examples 36-47 illustrate the effects of different loadings of butyl tosylate on the color of PPPBP-BPA copolycarbonate derived from high purity BPA (99.7% purity) without ultraviolet light stabilizers after the samples are molded under different conditions. Formulation and results are shown in Table 7.

TABLE 7

|  | CEx36 | Ex37 | Ex38 | Ex39 | Ex40 | Ex41 | Ex42 | Ex43 | Ex44 | CEx45 | CEx46 | CEx47 |
|---|---|---|---|---|---|---|---|---|---|---|---|---|
| Component (wt %) | | | | | | | | | | | | |
| CPC-2 | 99.59 | 98.91 | 98.58 | 98.25 | 99.31 | 99.25 | 99.18 | 99.05 | 98.91 | 99.47 | 99.42 | 99.36 |
| PETS | 0.3 | 0.3 | 0.3 | 0.3 | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 | 0.04 | 0.04 | 0.04 | 0.04 |
| $H_3PO_3$ premix | | | | | | | | | | 0.11 | 0.165 | 0.22 |
| Tosylate premix-1 | | 0.67 | 1.00 | 1.33 | | | | | | | | |
| Tosylate premix-2 | | | | | 0.27 | 0.33 | 0.40 | 0.53 | 0.67 | | | |
| Total | 100 | 100 | 100 | 100 | 100 | 100 | 100 | 100 | 100 | 100 | 100 | 100 |
| Sulfonic content (ppm) | 0 | 4 | 6 | 8 | 8 | 10 | 12 | 16 | 20 | | | |
| $H_3PO_3$ content (ppm) | 0 | 0 | 0 | 0 | 0 | 0 | 0 | 0 | 0 | 3 | 4.5 | 6 |
| Property | | | | | | | | | | | | |
| YI after molding* | | | | | | | | | | | | |
| at 330° C./5 min | 5.9 | 3.2 | 2.9 | 2.8 | 3.2 | 3.2 | 3.1 | 3.2 | 3.1 | 3.4 | 3.3 | 2.6 |
| at 350° C./7.5 min | 19.6 | 5.7 | 4.7 | 4.9 | 4.6 | 4.2 | 4.1 | 4.0 | 3.9 | 13.6 | 13.8 | 13.1 |
| at 355° C./10 min | 24.9 | 10.4 | 7.6 | 6.5 | 6.9 | 6.9 | 6.1 | 5.8 | 6.0 | 21.1 | 19.1 | 19.3 |
| at 350° C./12.5 min | 33.9 | 18.6 | 14.9 | 9.3 | | | | | | 28.3 | 26.6 | 25.4 |
| YI improvement vs CEx36 | | | | | | | | | | | | |
| at 330° C./5 min | — | −46 | −51 | −53 | −46 | −46 | −47 | −46 | −47 | −42 | −44 | −56 |
| at 350° C./7.5 min | — | −71 | −76 | −75 | −77 | −79 | −79 | −80 | −80 | −31 | −30 | −33 |
| at 355° C./10 min | — | −58 | −69 | −74 | −72 | −72 | −76 | −77 | −76 | −15 | −23 | −22 |
| at 350° C./12.5 min | — | −45 | −56 | −73 | | | | | | −17 | −22 | −25 |

*2.5 mm sample

The data in Table 7 shows that the addition of 4-20 ppm of butyl tosylate significantly improves YI of high purity PPPBP-BPA copolycarbonate without ultraviolet light stabilizers when the samples are molded at 330° C., 350° C., and 355° C. for 5-12.5 minutes compared to a control that does not contain butyl tosylate (CEx36), achieving color reductions between 45 and 75% depending on the conditions as well as reference samples containing $H_3PO_3$ instead of butyl tosylate (CEx45-47), which are having improvements of 30% or less. The improvement is more pronounced when the samples are molded under more abusive conditions.

Examples 48-60

Examples 48-60 illustrate the effects of different loadings of butyl tosylate on the color of PPPBP-BPA copolycarbonate derived from high purity BPA (99.7% purity) with ultraviolet light stabilizers after the samples are molded under different conditions. Formulation and results are shown in Table 8.

TABLE 8

|  | CEx48 | Ex50 | Ex51 | Ex52 | CEx53 | CEx54 | CEx58 | Ex59 | Ex60 |
|---|---|---|---|---|---|---|---|---|---|
| Component (wt %) | | | | | | | | | |
| CPC-2 | 99.28 | 99.15 | 99.08 | 99.01 | 99.22 | 99.17 | 99.58 | 99.01 | 98.88 |
| PETS | 0.3 | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 | 0.04 |
| UVA 234 | 0.3 | 0.3 | 0.3 | 0.3 | 0.3 | 0.3 | 0.3 | 0.3 | 0.3 |
| UVA 5411 | | | | | | | | | |
| $H_3PO_3$ premix | | | | | 0.055 | 0.11 | | | |
| Tosylate premix-2 | | 0.134 | 0.200 | 0.267 | | | 0.267 | 0.4 | 0.667 |
| Total | 100 | 100 | 100 | 100 | 100 | 100 | 100 | 100 | 100 |
| Sulfonic content (ppm) | 0 | 4 | 6 | 8 | 0 | 0 | 0 | 8 | 12 |
| $H_3PO_3$ content (ppm) | 0 | 0 | 0 | 0 | 1.5 | 3 | 0 | 0 | 0 |
| Property | | | | | | | | | |
| YI after molding | | | | | | | | | |
| 330° C./5 min/2.5 mm | | | | | | | 6.2 | 3.9 | 3.8 |
| 330° C./5 min/1 mm | 4.9 | 2.5 | 2.4 | 2.3 | 2.8 | 2.6 | | | |
| 350° C./7.5 min/2.5 mm | | | | | | | 14.7 | 5.2 | 4.9 |
| 355° C./10 min/2.5 mm | | | | | | | 22.9 | 6.1 | 5.8 |
| 355° C./10 min/1 mm | 14.8 | 7.1 | 5.8 | 7.1 | 12.4 | 10.9 | | | |
| YI improvement vs CEx | | Vs. CEx48 | Vs. CEx48 | Vs. CEx48 | Vs. CEx48 | Vs. CEx48 | | Vs. CEx58 | Vs. CEx58 |
| 330° C./5 min/2.5 mm | | | | | | | | −37 | −39 |
| 330° C./5 min/1 mm | | −49 | −51 | −53 | −43 | −47 | | | |

TABLE 8-continued

| | CEx48 | Ex50 | Ex51 | Ex52 | CEx53 | CEx54 | CEx58 | Ex59 | Ex60 |
|---|---|---|---|---|---|---|---|---|---|
| 350° C./7.5 min/2.5 mm | | | | | | | | −65 | −67 |
| 355° C./10 min/2.5 mm | | | | | | | | −73 | −75 |
| 355° C./10 min/1 mm | | −52 | −61 | −52 | −16 | −26 | | | |

The data in Table 8 shows that the addition of 4 to 20 ppm of butyl tosylate (Ex50 to 52 and Ex59 to 60) significantly improves YI of high purity PPPBP-BPA copolycarbonate with ultraviolet light stabilizer when the samples are molded at 330° C., 350° C., and 355° C. for 5 to 12.5 minutes compared to a control that does not contain butyl tosylate (CEx48 or CEx58), achieving color reductions between 40 and 61% depending on the conditions, as well as compared to reference samples containing $H_3PO_3$ instead of butyl tosylate (CEx53 to 54), which show improvements of 30% or less. The improvement is more pronounced when the samples are molded under more abusive conditions.

Examples 62-67

Examples 62-67 illustrate the effects of different loadings of butyl tosylate on the color of PPPBP-BPA copolycarbonate derived from standard purity BPA without ultraviolet light stabilizers after the samples are molded under different conditions. Formulation and results are shown in Table 9.

TABLE 9

| | Ex62 | Ex63 | Ex64 | Ex65 | Ex66 | Ex67 | CEx68 |
|---|---|---|---|---|---|---|---|
| Component (wt %) | | | | | | | |
| CPC-1 | 99.58 | 99.25 | 98.91 | 98.58 | 99.31 | 99.18 | 99.47 |
| PETS | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 |
| $H_3PO_3$ premix | | | | | | | 0.11 |
| Tosylate Premix-1 | | 0.33 | 0.67 | 1.00 | | | |
| Tosylate Premix-2 | | | | | 0.27 | 0.40 | |
| Total | | | | | | | |
| Organosulfonic content (ppm) | 0 | 2 | 4 | 6 | 8 | 12 | |
| $H_3PO_3$ content (ppm) | 0 | 0 | 0 | 0 | 0 | 0 | 3 |
| Property | | | | | | | |
| YI after molding | | | | | | | |
| at 330° C./5 min/2.5 mm | 3.72 | 2.44 | 3.00 | 2.84 | 2.82 | 2.84 | 3.55 |
| at 345° C./5 min/2.5 mm | | 3.81 | 3.81 | | | | 4.29 |
| at 345° C./7.5 min/2.5 mm | | 7.77 | 5.14 | | | | 10.64 |
| at 350° C./7.5 min/2.5 mm | 28.99 | | | 6.93 | 5.07 | 4.52 | 19.63 |
| at 355° C./10 min/2.5 mm | 35.59 | | | 15.71 | 9.25 | 8.86 | 26.74 |

The data in Table 9 shows that the addition of 2-12 ppm of butyl tosylate significantly improves YI of standard purity PPPBP-BPA copolycarbonate compositions that do not contain an ultraviolet light stabilizer when the samples are molded at 330° C., 345° C., 350° C., and 355° C. for five to ten minutes compared to a control that does not contain butyl tosylate as well as a reference sample containing $H_3PO_3$ instead of butyl tosylate. The improvement is more pronounced when the samples are molded under abusive conditions.

Examples 68-72

Examples 68-42 compare the color stability of PPPBP-BPA copolycarbonate/BPA homopolycarbonate blends that contain butyl tosylate, or $H_3PO_3$ stabilizer, or neither butyl tosylate nor $H_3PO_3$ stabilizer after autoclaving. Formulations and results are shown in Table 10.

TABLE 10

| Component (wt %) | CEx68 | CEx69 | CEx70 | Ex71 | Ex72 |
|---|---|---|---|---|---|
| CPC-1 | 63.70 | 63.70 | 63.70 | 63.70 | 63.70 |
| PC-1 | 7.0 | 7.0 | 7.0 | 7.0 | 7.0 |
| PC-2 | 28.88 | 28.55 | 28.44 | 28.21 | 27.88 |
| AO-1 | 0.08 | 0.08 | 0.08 | 0.08 | 0.08 |
| PETS | 0.3 | 0.3 | 0.3 | 0.3 | 0.3 |
| AO-2 | 0.04 | 0.04 | 0.04 | 0.04 | 0.04 |
| $H_3PO_3$ Premix | | | 0.11 | | |
| Tosylate premix-1 | | | | 0.67 | 0.67 |
| Epoxy | | 0.33 | 0.33 | | 0.33 |
| Total | 100 | 100 | 100 | 100 | 100 |
| Tosylate (ppm) | 0 | 0 | | 4 | 4 |
| Property | | | | | |
| YI before autoclaving | 2.2 | 2.9 | 2.5 | 2.2 | 2.2 |
| YI after autoclaving at 121° C. for 100 hours | 2.8 | 3.8 | 3.2 | 2.3 | 2.2 |
| YI shift (%) | 0.6 | 0.9 | 0.7 | 0.1 | 0 |

The results in Table 10 indicate that butyl tosylate improves color stability after autoclaving in compositions with and without JONCRYL epoxy (Ex71 and Ex72). Compositions without additional organosulfonic stabilizer have a YI shift of 0.5 and higher (CEx68 and CEx69). A composition with $H_3PO_3$ stabilizer has a YI shift of 0.7 (CEx70). Surprisingly a composition containing butyl tosylate has a YI shift of 0.1 (Ex71) and a composition containing butyl tosylate and an epoxy additive has no YI shift after autoclaving at 121° C. for 100 hours.

Examples 73-74

Examples 73-74 compare the effect of butyl tosylate loading on the color stability of PPPBP-BPA copolycarbonate compositions having 45 mol % PPPBP carbonate units. The results are summarized in Table 11.

TABLE 11

| Component | CEx73 | Ex74 |
|---|---|---|
| PPPBP carbonate units (mol. %) | 45 | 45 |
| Butyl tosylate (ppm) | 0 | 8 |
| YI after molding | | |

TABLE 11-continued

| Component | CEx73 | Ex74 |
|---|---|---|
| at 350° C./5 min | 27.31 | 21.49 |
| at 370° C./5 min | 43.39 | 36.9 |
| at 370° C./7.5 min | 59.05 | 52.39 |

The data shows that the addition of butyl tosylate to PPPBP-BPA copolycarbonate compositions having 45 mol % PPPBP carbonate units improves color after abusive molding.

Examples 77-84

Examples 77-84 illustrates various properties of compositions containing high purity PPPBP-BPA, butyl tosylate, and optionally a high purity BPA homopolycarbonate. Formulations and results are shown in Table 12. About 0.0002 wt % of a dye package was also present.

Examples 85-101

Examples 85-101 illustrate the effects of different organosulfonic stabilizers on the color of PPPBP-BPA copolycarbonate, optionally blended with a BPA homopolycarbonate after the samples are molded at 355° C. for 5 minutes or 10 minutes. For these examples, the molding conditions used were a sample drying time of 140° C. for 5 hours, using a J85AD (85 ton) molding machine by JSW. YI was determined on a 3.2 mm color plaque using on a MacBeth ColorEye7000A (ASTM D1925) as described above. The organosulfonic stabilizers screened are shown in Table 13.

TABLE 12

| Component | Unit | Ex77 | Ex78 | Ex79 | Ex82 | Ex83 | Ex84 |
|---|---|---|---|---|---|---|---|
| CPC-2 | wt % | 63.7 | 63.7 | 63.7 | 99.31 | 99.01 | 98.83 |
| PC4 | wt % | 28.68 | 28.38 | 23.9 | 0 | 0 | 0 |
| PC3 | wt % | 7 | 7 | 11.3 | 0 | 0 | 0 |
| Tosylate premix-2 | wt % | 0.2 | 0.2 | 0.2 | 0.27 | 0.27 | 0.27 |
| AO-1 | wt % | 0.08 | 0.08 | 0.08 | 0.08 | 0.08 | 0.08 |
| AO-2 | wt % | 0.04 | 0.04 | 0.04 | 0.04 | 0.04 | 0.04 |
| PETS | wt % | 0.3 | 0.3 | 0.3 | 0.3 | 0.3 | 0.3 |
| UVA234 | wt % | 0 | 0.3 | 0.3 | 0 | 0.3 | 0.3 |
| Rimar salt | wt % | 0 | 0 | 0.08 | 0 | 0 | 0.08 |
| Octaphenylcyclotetrasiloxane | wt % | 0 | 0 | 0.1 | 0 | 0 | 0.1 |
| Tensile Modulus, 1 mm/min | MPa | 2488 | 2511 | 2522 | 2550 | 2589 | 2571 |
| Tensile Stress, yield, 50 mm/min | MPa | 76 | 77 | 77 | 82 | 83 | 82 |
| Tensile Stress, break, 50 mm/min | MPa | 64 | 69 | 67 | 65 | 65 | 65 |
| Tensile Strain, yield, 50 mm/min | % | 6.4 | 6.9 | 6.9 | 7.3 | 7.3 | 7.2 |
| Tensile Strain, break, 50 mm/min | % | 60 | 84 | 78 | 40 | 30 | 27 |
| Flexural Modulus, 2 mm/min | MPa | 2524 | 2518 | 2526 | 2547 | 2634 | 2574 |
| Flexural Stress, yield, 2 mm/min | MPa | 116 | 117 | 114 | 123 | 125 | 124 |
| Izod Impact, notched, +23° C. | J/m | 89 | 83 | 80 | 74 | 72 | 76 |
| Izod Impact, notched, −30° C. | J/m | NA | 79 | 78 | 73 | 68 | 74 |
| Izod Impact, notched* +23° C. | kJ/m² | 8 | 8 | 8 | 8 | 7 | 7 |
| Izod Impact, notched* −30° C. | kJ/m² | NA | 6 | 7 | 6 | 6 | 7 |
| Vicat Softening Temp, B/120 | ° C. | 173.1 | 171.7 | 171.6 | 192.9 | 191.0 | 189.7 |
| HDT | ° C. | 164.7 | 165.5 | 165.4 | 186.0 | 185.0 | 184.4 |
| MVR at 330° C./2.16 kg, 300 s | cm³/10 min | 29.51 | 30.77 | 33.27 | 14.1 | 15.0 | 16.7 |
| Transmission at 400 nm, 1 mm | % | 86.5 | | | 85.5 | 71.4 | 82.9 |
| Transmission at 400 nm, 2 mm | % | 84.8 | | | 82.4 | 58.7 | 78.2 |
| Transmission at 400 nm, 3 mm | % | 82.8 | | | 79.6 | 48.5 | 73.6 |
| Transmission at 550 nm, 1 mm | % | 88.1 | | | 88.1 | 87.2 | 87.8 |
| Transmission at 550 nm, 2 mm | % | 86.8 | | | 86.7 | 85.2 | 86.5 |
| Transmission at 550 nm, 3 mm | % | 85.5 | | | 85.3 | 83.1 | 85.0 |
| Transmission at 940 nm, 1 mm | % | 90.3 | | | 90.1 | 90.1 | 90.0 |
| Transmission at 940 nm, 2 mm | % | 90.2 | | | 90.0 | 89.9 | 89.9 |
| Transmission at 940 nm, 3 mm | % | 89.9 | | | 89.8 | 89.8 | 89.6 |
| Transmission at 1310 nm, 1 mm | % | 90.0 | | | 89.8 | 89.8 | 89.8 |
| Transmission at 1310 nm, 2 mm | % | 89.3 | | | 89.2 | 89.1 | 89.1 |
| Transmission at 1310 nm, 3 mm | % | 88.6 | | | 88.5 | 88.5 | 88.4 |
| Total transmission, 1 mm | % | 89.5 | 89.0 | 90.0 | 89.5 | 88.7 | 89.3 |
| Total transmission, 2 mm | % | 88.4 | 88.7 | 88.9 | 88.1 | 86.6 | 88.0 |
| Total transmission, 3 mm | % | 87.1 | 7.4 | 87.8 | 86.8 | 84.7 | 86.7 |
| Haze, 1 mm | % | 0.4 | 0.3 | 0.3 | 0.4 | 0.4 | 0.3 |
| Haze, 2 mm | % | 0.7 | 0.3 | 0.3 | 0.6 | 0.6 | 0.4 |
| Haze, 3 mm | % | 0.9 | 0.4 | 0.4 | 0.8 | 0.8 | 0.5 |
| Refractive index at 587.6 nm | — | 1.602 | 1.602 | NA | 1.609 | 1.609 | NA |
| Refractive index at 940 nm | — | 1.583 | 1.583 | NA | 1.589 | 1.589 | NA |
| Refractive index at 1310 nm | — | 1.577 | 1.577 | NA | 1.583 | 1.583 | NA |
| Abbe number | — | 30 | 30 | NA | 29 | 29 | NA |
| UL94 rating at 2.5 mm | — | NA | NA | V0 | NA | NA | V0 |
| UL94 rating at 2.0 mm | — | NA | NA | V2 | NA | NA | V2 |
| UL94 rating at 1.5 mm | — | NA | NA | V2 | NA | NA | V2 |
| UL94 rating at 0.8 mm | — | NA | NA | V2 | NA | NA | V2 |

TABLE 13

| Name | Organosulfonic stabilizer |
|---|---|
| Sodium p-toluenesulfonic acid (p-TSA Na) | (structure) |
| Phenyl p-toluenesulfonate (Ph tosylate) | (structure) |
| 4-Docecylbenzenesulfonic acid (4-DBSA) | (structure) |
| Polystyrene sulfonic acid (Polyp-TSA) | (structure) |
| Butyl tosylate (n-Bu tosylate) | (structure) |
| Ethyl tosylate (Et Tosylate) | (structure) |
| p-Toluenesulfonic anhydride (p-TSAA) | (structure) |
| Octadecyl p-toluenesulfonate (OD p-TS) | (structure) |
| Camphorsulfonic acid (10-CSA) | (structure) |
| p-Toluenesulfonic acid (p-TSA) | (structure) |

The formulations and results are shown in Table 14 and FIG. 1. The level of organosulfonic stabilizer in the premix was 6 ppm (0.06 wt %). CEx96 to CEx98 are comparative examples with no organosulfonic stabilizer.

TABLE 14

| Component (wt %) | Ex85 | Ex86 | Ex87 | Ex88 | Ex89 | Ex90 | Ex91 | CEx96 | Ex99 |
|---|---|---|---|---|---|---|---|---|---|
| CPC-1 | 63.49 | 63.49 | 63.49 | 63.49 | 63.49 | 63.49 | 63.49 | 63.64 | 63.49 |
| CPC-2 | | | | | | | | | |
| PC-1 | 7.0 | 7.0 | 7.0 | 7.0 | 7.0 | 7.0 | 7.0 | 7.0 | 7.0 |
| PC-2 | 29.0 | 29.0 | 29.0 | 29.0 | 29.0 | 29.0 | 29.0 | 29.0 | 29.0 |
| PETS | 0.3 | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 | 0.04 |
| n-Bu tosylate premix | 0.15 | | | | | | | | |
| p-TSA premix | | 0.15 | | | | | | | |
| Poly p-TSA premix | | | 0.15 | | | | | | |
| Et Tosylate premix | | | | 0.15 | | | | | |
| OD p-TS premix | | | | | 0.15 | | | | |
| p-TSAA premix | | | | | | 0.15 | | | |
| 4-DBSA premix | | | | | | | 0.15 | | |

TABLE 14-continued

| | | | | | | | | | |
|---|---|---|---|---|---|---|---|---|---|
| p-TSA Na premix | | | | | | | | | 0.15 |
| 10-CSA premix | | | | | | | | | |
| Ph tosylate premix | | | | | | | | | |
| Total | 100 | 100 | 100 | 100 | 100 | 100 | 100 | 100 | 100 |
| Property YI after molding* | | | | | | | | | |
| at 355° C./5 min | 3.8 | 3.7 | 4.9 | 3.8 | 3.8 | 3.7 | 3.7 | 7.5 | 6.3 |
| at 355° C./10 min | 9.9 | 10.6 | 10.4 | 9.5 | 11.5 | 10.5 | 9.0 | 23.5 | 23.2 |

| Component (wt %) | Ex100 | Ex101 | Ex92 | Ex93 | CEx97 | Ex94 | Ex95 | CEx98 |
|---|---|---|---|---|---|---|---|---|
| CPC-1 | 63.49 | 63.49 | | | | | | |
| CPC-2 | | | 63.49 | 63.49 | 63.64 | 99.49 | 99.49 | 99.64 |
| PC-1 | 7.0 | 7.0 | 7.0 | 7.0 | 7.0 | | | |
| PC-2 | 29.0 | 29.0 | 29.0 | 29.0 | 29.0 | | | |
| PETS | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 |
| n-Bu tosylate premix | | | 0.15 | | | 0.15 | | |
| p-TSA premix | | | | 0.15 | | | 0.15 | |
| Poly p-TSA premix | | | | | | | | |
| Et Tosylate premix | | | | | | | | |
| OD p-TS premix | | | | | | | | |
| p-TSAA premix | | | | | | | | |
| 4-DBSA premix | | | | | | | | |
| p-TSA Na premix | | | | | | | | |
| 10-CSA premix | 0.15 | | | | | | | |
| Ph tosylate premix | | 0.15 | | | | | | |
| Total | 100 | 100 | 100 | 100 | 100 | 100 | 100 | 100 |
| Property YI after molding* | | | | | | | | |
| at 355° C./5 min | 4.5 | 7.1 | 3.4 | 3.5 | 3.9 | 5.7 | 5.9 | 11.7 |
| at 355° C./10 min | 17.9 | 23.4 | 4.3 | 4.3 | 12.3 | 9.4 | 11.3 | 33.9 |

*3.2 mm thickness plaque

Comparison of CEx96, Ex99, and Ex101 show that the sodium salt of p-toluene sulfonic acid and have very little effect on the color of a blend of PPPBP-BPA copolycarbonate and phenyl tosylate a BPA homopolycarbonate after abusive molding. It may be possible to substitute the phenyl group of phenyl tosylate to improve its efficacy. For example, it may be that certain substituents that improve the leaving group capability of the phenyl group can be used. Ex 100 shows that camphorsulfonic acid provides certain improvement on color after abusive molding; however, the improvement is limited. The remaining organosulfonic stabilizers significantly improve the color of PPP-BPA copolycarbonate or a blend of PPP-BPA copolycarbonate and a BPA homopolycarbonate, after abusive molding at 355° C. for 5 minutes or 10 minutes.

Set forth below are various embodiments of the disclosure.

Embodiment 1

A thermoplastic composition comprises: a copolycarbonate comprising bisphenol A carbonate units and second carbonate units of formula (1) wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4, optionally a bisphenol A homopolycarbonate; and 2 to 40 ppm of an organosulfonic stabilizer of formula (8) wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is $C_{1-30}$ alkyl; or $R^8$ is a group of the formula —S(=O)$_2$—$R^7$; wherein the second carbonate units are present in an amount of 20 to 49 mol %, preferably 30 to 40 mol % based on the sum of the moles of the copolycarbonate and the bisphenol A homopolycarbonate; and wherein the thermoplastic composition has: a Vicat B120 of 160° C. or higher measured according to ISO 306; and a yellowness index of less than 12, preferably less than 8, more preferably less than 6 measured according to ASTM D1925 on a plaque of 2.5 mm thickness molded at a temperature of 355° C. for a residence time of 10 minutes.

Embodiment 2

The thermoplastic composition of embodiment 1, wherein in the second carbonate units of the copolycarbonate, $R^a$ and $R^b$ are each independently a $C_{1-3}$ alkyl group, $R^3$ is each independently a $C_{1-6}$ alkyl group, $R^4$ is hydrogen, $C_{1-6}$ alkyl or phenyl optionally substituted with 1 to 5 $C_{1-6}$ alkyl groups, and p, q, and j are each independently 0 to 4.

Embodiment 3

The thermoplastic composition of embodiment 1 or embodiment 2, wherein the second carbonate repeating units in the copolycarbonate are of the formula (1a) wherein $R^5$ is hydrogen, phenyl or methyl, preferably phenyl.

Embodiment 4

The thermoplastic composition of any one or more of embodiments 1 to 3, wherein the copolycarbonate comprises from 15 to 90 mole percent of the bisphenol A carbonate units and 10 to 85 mole percent of the second carbonate units, each based on the total number of carbonate units in the copolycarbonate.

Embodiment 5

The thermoplastic composition of any one or more of embodiments 1 to 4, wherein the copolycarbonate comprises from 50 to 90 mole percent of the bisphenol A carbonate units and 10 to 50 mole percent of the second carbonate units, and has less than 15 mole percent of the second carbonate units directly coupled to another second carbonate unit, each based on the total number of carbonate units in the copolycarbonate.

Embodiment 6

The thermoplastic composition of any one or more of embodiments 1 to 5, wherein the copolycarbonate further comprises at least 5 mole percent of a third carbonate unit different from the bisphenol A carbonate units and the second carbonate units, the third carbonate unit comprising units of the formula (3)-(7) or a combination thereof, wherein W and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, or $—C(P^1)(P^2)—$ wherein $P^1$ is $C_{1-12}$ alkyl and $P^2$ is $C_{6-12}$ aryl, and m and n are each independently 0 to 4.

Embodiment 6

The thermoplastic composition of embodiment 6, wherein the third carbonate units are of the formula (3a)-(3k), or a combination thereof, wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^1$ is independently hydrogen or $C_{1-4}$ alkyl, each $R^2$ is independently $C_{1-4}$ alkyl or hydrogen, g is 0 to 10, and m and n are each independently 0 to 4.

Embodiment 7

The thermoplastic composition of embodiment 6 or embodiment 7, wherein each $R^1$ is independently hydrogen or methyl, each $R^2$ is independently methyl or hydrogen, g is 0 to 2, and m and n are 0.

Embodiment 9

The thermoplastic composition of anyone or more of embodiments 6 to 8 wherein the copolycarbonate comprises from 15 to 70 mole percent of the bisphenol A carbonate units, 5 to 50 mole percent of the second carbonate units, and 5 to 50 mole percent of the third carbonate units, each based on the total number of carbonate units in the copolycarbonate.

Embodiment 10

The thermoplastic composition of any one or more of embodiments 1 to 9, and optionally wherein the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, preferably wherein the thermoplastic composition comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

Embodiment 11

The thermoplastic composition of any one or more of embodiment 1 to 10, wherein in the organosulfonic stabilizer each $R^7$ is independently a $C_{6-12}$ aryl, $C_{7-24}$ alkylarylene, or a polymer unit derived from a $C_{2-14}$ ethylenically unsaturated aromatic sulfonic acid or its $C_{1-30}$ alkyl ester; and $R^8$ is hydrogen, $C_{1-24}$ alkyl, or a group of the formula $—S(=O)_2—R^7$ wherein $R^7$ is a $C_{6-12}$ aryl or $C_{7-24}$ alkylarylene.

Embodiment 12

The thermoplastic composition of any one or more of embodiments 1 to 11, wherein in the organosulfonic stabilizer
- $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula $—S(=O)_2—R^7$ wherein $R^7$ is a $C_{6-12}$ aryl or $C_{7-24}$ alkylarylene; or
- $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula $—S(=O)_2—R^7$ wherein $R^7$ is a $C_{7-10}$ alkylarylene; or
- $R^7$ is a polymer unit derived from a $C_{2-14}$ ethylenically unsaturated aromatic sulfonic acid, preferably p-styrene sulfonic acid or para-methyl styrene sulfonic acid; or $R^7$ is a $C_{1-10}$ alkyl ester of a $C_{7-12}$ alkylarylene sulfonic acid, preferably of p-toluene sulfonic acid, more preferably butyl tosylate; or $R^7$ is a group of the formula —S(=O)$_2$—$R^1$ wherein $R^7$ is a $C_{6-12}$ aryl or $C_{7-24}$ alkylarylene, preferably a $C_{7-10}$ alkylarylene.

$R^7$ is a $C_{11-24}$ alkylarylene sulfonic acid, and $R^7$ is hydrogen.

Embodiment 13

The thermoplastic composition any one or more of embodiment 1 to 10, wherein the stabilizer is present in an amount of 2 ppm to 20 ppm, preferably 4 ppm to 15 ppm, based on the total weight of the thermoplastic composition.

Embodiment 14

The thermoplastic composition of any one or more of embodiments 1 to 13, wherein the thermoplastic composition has a bisphenol A purity of equal to or greater than 99.6%, or of equal to or greater than 99.7% measured by high performance liquid chromatography.

Embodiment 15

The thermoplastic composition of any one or more of embodiments 1 to 14, wherein the polycarbonate homopolymer is present in an amount of 10 to 90 wt %, preferably 10 to 65 wt %, more preferably 15 wt % 50 wt %, most preferably 20 to 45 wt %, based on the total weight of the thermoplastic composition.

Embodiment 16

The thermoplastic composition of any or more of embodiments 1 to 15 comprising: a copolycarbonate comprising bisphenol A carbonate units and second carbonate units of the formula (1a), wherein $R^5$ is hydrogen, phenyl or methyl, preferably phenyl, optionally a bisphenol A homopolycarbonate; and 2 to 20 ppm or 4 to 10 ppm of an organosulfonic stabilizer comprising a $C_{1-30}$ alkyl ester of p-toluenesulfonic acid, and more preferably butyl tosylate; wherein the thermoplastic composition has 25 mol % to 49 mol % or 30 to 40 mol % of second carbonate units based on the sum of the moles of the copolycarbonate and the bisphenol A homopolycarbonate.

Embodiment 17

The thermoplastic composition of any one or more of embodiments 1 to 15, comprising, based on the total weight of the thermoplastic composition: 60 to 70 wt % of a copolycarbonate comprising bisphenol A carbonate units and second carbonate units of the formula (1a) wherein $R^5$ is hydrogen, phenyl or methyl, preferably phenyl, 25 to 40 wt % of a bisphenol A homopolycarbonate; and 2 to 20 ppm or 4 to 10 ppm or 4 to 8 ppm of an organosulfonic stabilizer comprising p-toluenesulfonic acid, a $C_{1-30}$ alkyl ester of p-toluenesulfonic acid or a combination thereof, and more preferably butyl tosylate; wherein the thermoplastic composition has 25 mol % to 49 mol % or 30 to 40 mol % of second carbonate units based on the sum of the moles of the copolycarbonate and the bisphenol A homopolycarbonate.

Embodiment 18

The thermoplastic composition of any one or more of embodiments 1 to 15, comprising, based on the total weight of the thermoplastic composition: 96 to 99.9 wt % of a copolycarbonate comprising bisphenol A carbonate units and second carbonate units of the formula (1a) wherein $R^5$ is hydrogen, phenyl or methyl, preferably phenyl; and 2 to 20 ppm or 4 to 10 ppm, or 4 to 8 ppm of an organosulfonic stabilizer comprising a $C_{1-30}$ alkyl ester of p-toluenesulfonic acid, and more preferably butyl tosylate; wherein the thermoplastic composition has 25 mol % to 49 mol %, or 30 to 40 mol % of second carbonate units based on the moles of the copolycarbonate.

Embodiment 19

The thermoplastic composition of any one or more of embodiments 1 to 18, further comprising a processing aid, a heat stabilizer, an ultraviolet light absorber, a colorant, a flame retardant, an impact modifier, an epoxy containing polymer, or a combination thereof.

Embodiment 20

The thermoplastic composition of any one or more of embodiments 1 to 19, wherein the thermoplastic composition has one or more of the following properties: a heat deflection temperature of 160° C. or higher as measured on a 80×10×4 mm bar with a 64 mm span at 0.45 MPa according to ISO 75/Bf; a haze of less than 1.5%, or less than 1.0% and a total transmission greater than 86% or greater than 88%, each measured according to ASTM D1003-00 on a molded plaque with a 1.0 mm thickness; a haze of less than 1.5, or less than 1.0 and a total transmission greater than 84% or greater than 86%, each measured according to ASTM D1003-00 on a molded plaque with a 3.0 mm thickness; a transmission at wavelength of 400 nm of greater than 75%, or greater than 80% or greater than 85% measured with Perkin Elmer 950 spectrometer equipped with 15 cm integrated sphere on a molded plaque with a thickness of 1 mm; a transmission at wavelength of 550 nm of greater than 85%, or greater than 87% or greater than 88% measured with Perkin Elmer 950 spectrometer equipped with 15 cm integrated sphere on a molded plaque with a thickness of 1 mm; a transmission at wavelength of 940 nm of greater than 88%, or greater than 89% or greater than 90% measured with Perkin Elmer 950 spectrometer equipped with 15 cm integrated sphere on a molded plaque with a thickness of 1 mm; a refractive index of greater than 1.59 or greater than 1.60 at 587.6 nm or a refractive index of greater than 1.57 or greater than 1.58 at 940 nm measured according to ISO 489 on a molded plaque with a thickness of 1 mm; an Abbe number of less than 32 or less than 30 measured according to ISO 489 on a molded plaque with a thickness of 1 mm; melt volume flow rate (MVR) greater than 10 cc/min, measured at 330° C./2.16 Kg at 360 second dwell according to ISO 1133; an Izod notched impact energy of at least 6 kJ/m$^2$, or of at least 8 kJ/m$^2$, as measured at 23° C. according to ISO 180/1A using a multipurpose test specimen in accordance with ISO 3167 TYPE A; an Izod notched impact energy of at least 70 J/m, or of at least 88 J/m, as measured at 23° C. according to ASTM D256; an increase in yellowness index of less than 10, or of less than 8 after 500 hours of heat aging at 155° C., as measured by ASTM D1925 on a 2.5 mm thick molded plaque; an increase in yellowness index of less than 10, or of less than 8 during 1000 hours of heat aging at 155° C., as measured by ASTM D1925 on a 1.0 mm thick molded plaque; an increase in yellowness index of less than 6, or of less than 5 during 1500 hours of heat aging at 140° C., as measured by ASTM D1925 on a 1.0 mm thick molded plaque; an increase in yellowness index of less than 0.5, or of less than 0.3 after 100 hours of hydroaging at 121° C. in an autoclave, as measured by ASTM D1925 on a 2.5 mm thick molded plaque; a UL94-V0 rating at a thickness of 2.5 mm or higher; or a UL94-V2 rating ata thickness of 0.8 mm to 1.5 mm.

Embodiment 21

The composition of any one or more of embodiments 1 to 20, wherein the copolycarbonate has a hydroxyl end group content of less than 200 ppm and the optional bisphenol A homopolycarbonate has a hydroxyl end group content of less than 150 ppm.

Embodiment 22

The composition of any one or more of embodiments 1 to 21, wherein the optional bisphenol A homopolycarbonate has a sulfur content of less than 2 ppm, or the copolycarbonate, the optional bisphenol A homopolycarbonate, or both are derived from a bisphenol A having a sulfur content of less than 2 ppm, each as measured by a Total Sulfur Analysis based on combustion and coulometric detection, or the optional bisphenol A homopolycarbonate.

Embodiment 23

An article comprising the copolymer or composition of any one or more of embodiments 1 to 18, wherein the article is a molded article, a thermoformed article, an extruded layer, a layer of a multi-layer article, a substrate for a coated article, or a substrate for a metallized article.

Embodiment 24

The article of embodiment 23, wherein the article has no significant part distortion or discoloration when the article is subjected to a secondary operation comprising over-molding, lead-free soldering, wave soldering, low temperature soldering, wave soldering, coating with a high-temperature cure, or a combination thereof.

Embodiment 25

The article of any one or more of embodiments 21 to 23, wherein the article is a lens, a light guide, a waveguide, a collimator, an optical fiber, a window, a door, a visor, a display screen, an electronic device, a scientific or medical device, a safety shield, a fire shield, wire or cable sheathing, a mold, a dish, a tray, a screen, an enclosure, glazing, packaging, a gas barrier, an anti-fog layer, or an anti-reflective layer.

Embodiment 26

The article of any one or more of embodiments 21 to 23, wherein the article is a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of an anti-fog assembly, or a component of an anti-reflective assembly.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" includes any combination comprising at least one of the listed components or properties optionally together with a like component or property not listed.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group as defined above, with 4-methylphenyl being an exemplary alkylarylene group; "arylalkylene" refers to an alkyl group that has been substituted with an aryl group as defined above, with benzyl being an exemplary arylalkylene group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include (—$NO_2$), cyano (—CN), halogen, thiocyano (—SCN), $C_{2-6}$ alkanoyl (e.g., acyl ($H_3CC$(=O)—); carboxamido; $C_{1-6}$ or $C_{1-3}$ alkyl, cycloalkyl, alkenyl, and alkynyl; $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1 to 3 separate or fused rings and 6 to 18 ring carbon atoms; or arylalkoxy having 1 to 3 separate or fused rings and 6 to 18 ring carbon atoms. The stated number of carbon atoms includes any substituents.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition, comprising, based on the total weight of the thermoplastic composition:
   96 to 99.9 wt % of a copolycarbonate comprising bisphenol A carbonate units and second carbonate units of the formula

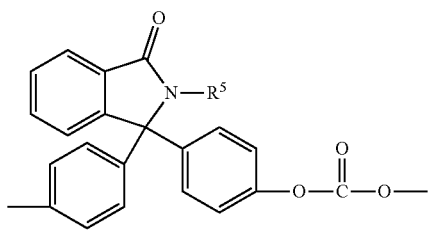

wherein $R^5$ is phenyl or methyl;
   optionally a bisphenol A homopolycarbonate; and
   4 to 10 ppm of an organosulfonic stabilizer comprising butyl tosylate;
   wherein the thermoplastic composition has 30 mol % to 40 mol % of second carbonate units based on the sum of the moles of the copolycarbonate and the bisphenol A homopolycarbonate; and
   the thermoplastic composition has a Vicat B120 of 160° C. or higher measured according to ISO 306 and a yellowness index of less than 12, measured according to ASTM D1925 on a plaque of 2.5 mm thickness molded at a temperature of 355° C. for a residence time of 10 minutes.

2. The thermoplastic composition of claim 1, wherein the copolycarbonate comprises from 50 to 90 mole percent of the bisphenol A carbonate units and 10 to 50 mole percent of the second carbonate units, and has less than 15 mole percent of the second carbonate units directly coupled to another second carbonate unit, each based on the total number of carbonate units in the copolycarbonate.

3. The thermoplastic composition of claim 1, wherein the copolycarbonate further comprises at least 5 mole percent of a third carbonate unit different from the bisphenol A carbonate units and the second carbonate units, the third carbonate unit comprising units of the formula

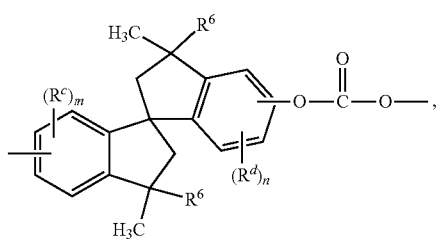

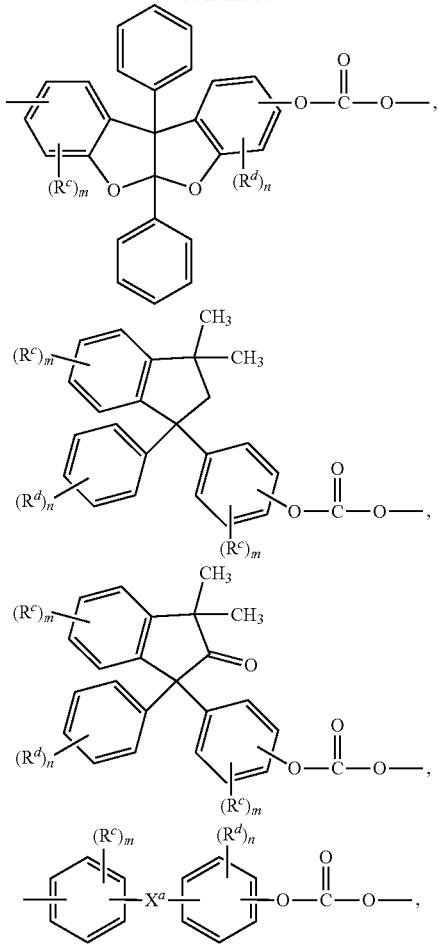

or a combination thereof, wherein
   $R^c$ and $R^d$ are each independently a $C_{1-12}$ alkyl, $C_{1-12}$ alkenyl, $C_{3-8}$ cycloalkyl, or $C_{1-12}$ alkoxy,
   each $R^6$ is independently $C_{1-3}$ alkyl or phenyl,
   $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$alkylene, G is a $C_{3-10}$ cycloalkylene, x is 0 or 1, and y is 1, or $-C(P^1)(P^2)-$ wherein $P^1$ is $C_{1-12}$ alkyl and $P^2$ is $C_{6-12}$ aryl, and
   m and n are each independently 0 to 4.

4. The thermoplastic composition of claim 3 wherein the copolycarbonate comprises from 15 to 70 mole percent of the bisphenol A carbonate units, 5 to 50 mole percent of the second carbonate units, and 5 to 50 mole percent of the third carbonate units, each based on the total number of carbonate units in the copolycarbonate.

5. The thermoplastic composition of claim 1,
   wherein the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

6. The composition of claim 1, wherein the optional bisphenol A homopolycarbonate has a sulfur content of less than 2 ppm, or the copolycarbonate, the optional bisphenol A A homopolycarbonate, or both are derived from a bisphenol A having a sulfur content of less than 2 ppm, each as measured by a Total Sulfur Analysis based on combustion and coulometric detection.

7. An article comprising the copolymer of claim 1, wherein the article is a molded article, a thermoformed article, an extruded layer, a layer of a multi-layer article, a substrate for a coated article, or a substrate for a metallized article.

8. The article of claim 7, wherein the article has no significant part distortion or discoloration when the article is subjected to a secondary operation comprising over-molding, lead-free soldering, wave soldering, low temperature soldering, wave soldering, coating with a high-temperature cure, or a combination thereof.

9. The article of claim 7, wherein the article is a lens, a light guide, a waveguide, a collimator, an optical fiber, a window, a door, a visor, a display screen, an electronic device, a scientific or medical device, a safety shield, a fire shield, wire or cable sheathing, a mold, a dish, a tray, a screen, an enclosure, glazing, packaging, a gas barrier, an anti-fog layer, or an anti-reflective layer.

10. The article of claim 7, wherein the article is a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of an anti-fog assembly, or a component of an anti-reflective assembly.

11. The thermoplastic composition of claim 1, wherein the organosulfonic stabilizer is present in an amount of 4 to 8 ppm based on the total weight of the thermoplastic composition.

12. The thermoplastic composition of claim 1, further comprising a bisphenol A homopolycarbonate.

\* \* \* \* \*